(12) United States Patent
Yee et al.

(10) Patent No.: US 7,121,097 B2
(45) Date of Patent: Oct. 17, 2006

(54) CONTROL STRATEGY FOR FLEXIBLE CATALYTIC COMBUSTION SYSTEM

(75) Inventors: David K. Yee, Hayward, CA (US);
Marco A. Velasco, Modesto, CA (US);
Sarento G. Nickolas, San Jose, CA (US); Ralph A. Dalla Betta, Mountain View, CA (US)

(73) Assignee: Catalytica Energy Systems, Inc., Mountain View, CA (US)

( * ) Notice: Subject to any disclaimer, the term of this patent is extended or adjusted under 35 U.S.C. 154(b) by 237 days.

(21) Appl. No.: 09/942,976

(22) Filed: Aug. 29, 2001

(65) Prior Publication Data

US 2004/0206090 A1    Oct. 21, 2004

Related U.S. Application Data

(60) Provisional application No. 60/262,282, filed on Jan. 16, 2001.

(51) Int. Cl.
*F02C 7/22*    (2006.01)
*F02C 7/26*    (2006.01)

(52) U.S. Cl. .................. 60/777; 60/723; 60/39.822

(58) Field of Classification Search ............... 60/777, 60/723, 737, 39.822
See application file for complete search history.

(56) References Cited

U.S. PATENT DOCUMENTS

| | | | |
|---|---|---|---|
| 3,938,326 A * | 2/1976 | DeCorso et al. ............... 60/723 |
| 3,943,705 A * | 3/1976 | DeCorso et al. ............... 60/723 |
| 3,975,900 A | 8/1976 | Pfefferle |
| 4,072,007 A * | 2/1978 | Sanday ......................... 60/723 |
| 4,112,675 A * | 9/1978 | Pillsbury et al. ............... 60/777 |
| 4,473,536 A | 9/1984 | Carberg et al. |
| 4,534,165 A | 8/1985 | Davis, Jr. et al. |
| 4,726,181 A * | 2/1988 | Pillsbury ...................... 60/777 |
| 4,731,989 A * | 3/1988 | Furuya et al. ................. 60/775 |
| 4,966,001 A | 10/1990 | Beebe |
| 5,000,004 A * | 3/1991 | Yamanaka et al. ............ 60/723 |
| 5,133,180 A | 7/1992 | Horner et al. |
| 5,139,755 A | 8/1992 | Seeker et al. |
| 5,161,366 A | 11/1992 | Beebe |
| 5,165,224 A | 11/1992 | Spadaccini et al. |
| 5,183,401 A | 2/1993 | Dalla Betta et al. |

(Continued)

FOREIGN PATENT DOCUMENTS

WO    WO 02/073090    9/2002

OTHER PUBLICATIONS

Felder, R.M. and Rousseau, R.W. (1978). "Elementary Principles of Chemical Processes," John Wiley and Sons, New York. p. 414.

(Continued)

*Primary Examiner*—William H. Rodriguez
(74) *Attorney, Agent, or Firm*—Morrison & Foerster LLP

(57) ABSTRACT

A control system for a catalytic combustion system on a gas turbine includes a flame preburner, a fuel injector positioned downstream of the preburner and a catalyst positioned downstream of the fuel injector. In such systems, a portion of the fuel combusts within the catalyst itself and the remainder of the fuel combusts in a homogeneous combustion process wave downstream of the catalyst. A sensor in communication with the control system monitors the homogeneous combustion process wave and adjusts the gas temperature at the catalyst inlet to a preferred value based on a predetermined schedule that relates the catalyst inlet gas temperature to operating fundamentals such as adiabatic combustion temperature or the gas turbine's exhaust gas temperature.

33 Claims, 7 Drawing Sheets

U.S. PATENT DOCUMENTS

| | | | |
|---|---|---|---|
| 5,232,357 A | 8/1993 | Dalla Betta et al. | |
| 5,235,804 A | 8/1993 | Colket, III et al. | |
| 5,248,251 A | 9/1993 | Dalla Betta et al. | |
| 5,250,489 A | 10/1993 | Dalla Betta et al. | |
| 5,259,754 A | 11/1993 | Dalla Betta et al. | |
| 5,263,325 A | 11/1993 | McVey et al. | |
| 5,263,998 A | 11/1993 | Mackrodt et al. | |
| 5,269,679 A | 12/1993 | Syska et al. | |
| 5,281,128 A | 1/1994 | Dalla Betta et al. | |
| 5,318,436 A | 6/1994 | Colket, III et al. | |
| 5,413,477 A | 5/1995 | Moreland | |
| 5,425,632 A | 6/1995 | Tsurumi et al. | |
| 5,452,574 A | 9/1995 | Cowell et al. | |
| 5,461,855 A | 10/1995 | Inoue et al. | |
| 5,461,864 A * | 10/1995 | Betta et al. | 60/723 |
| 5,511,972 A | 4/1996 | Dalla Betta et al. | |
| 5,512,250 A | 4/1996 | Betta et al. | |
| 5,518,697 A | 5/1996 | Dalla Betta et al. | |
| 5,551,869 A | 9/1996 | Brais et al. | |
| 5,554,021 A | 9/1996 | Robertson et al. | |
| 5,569,020 A | 10/1996 | Griffin et al. | |
| 5,581,997 A | 12/1996 | Janes | |
| 5,634,784 A | 6/1997 | Pfefferle et al. | |
| 5,729,967 A * | 3/1998 | Joos et al. | 60/39.6 |
| 5,826,429 A | 10/1998 | Beebe et al. | |
| 5,879,148 A | 3/1999 | Cheng et al. | |
| 5,896,738 A | 4/1999 | Yang et al. | |
| 5,913,675 A | 6/1999 | Vago et al. | |
| 5,937,632 A | 8/1999 | Döbbeling et al. | |
| 5,937,634 A | 8/1999 | Etheridge et al. | |
| 5,957,682 A | 9/1999 | Kamal et al. | |
| 5,965,001 A | 10/1999 | Chow et al. | |
| 5,985,222 A | 11/1999 | Sudduth et al. | |
| 6,000,212 A * | 12/1999 | Kolaczkowski et al. | 60/776 |
| 6,038,861 A | 3/2000 | Amos et al. | |
| 6,066,303 A | 5/2000 | Sudduth et al. | |
| 6,082,111 A | 7/2000 | Stokes | |
| 6,089,855 A | 7/2000 | Becker et al. | |
| 6,094,916 A | 8/2000 | Puri et al. | |
| 6,095,793 A | 8/2000 | Greeb | |
| 6,105,360 A | 8/2000 | Willis | |
| 6,109,018 A * | 8/2000 | Rostrup-Nielsen et al. | 60/777 |
| 6,116,014 A * | 9/2000 | Dalla Betta et al. | 60/777 |
| 6,122,916 A | 9/2000 | Amos et al. | |
| 6,201,029 B1 | 3/2001 | Waycuilis | |
| 6,217,832 B1 | 4/2001 | Betta et al. | |
| 6,226,977 B1 | 5/2001 | Ichiryu et al. | |
| 6,237,343 B1 | 5/2001 | Butler | |
| 6,250,877 B1 | 6/2001 | Westphal et al. | |
| 6,280,695 B1 | 8/2001 | Lissianski et al. | |
| 6,286,482 B1 | 9/2001 | Flynn et al. | |
| 6,289,667 B1 | 9/2001 | Kolaczkowski et al. | |
| 6,298,654 B1 | 10/2001 | Vermes et al. | |
| 6,718,772 B1 * | 4/2004 | Dalla Betta et al. | 60/776 |
| 6,796,129 B1 * | 9/2004 | Yee et al. | 60/777 |
| 2001/0046650 A1 | 11/2001 | Smith et al. | |
| 2002/0083715 A1 * | 7/2002 | Dalla Betta et al. | 60/777 |
| 2003/0056519 A1 * | 3/2003 | Newburry | 60/777 |
| 2004/0011056 A1 * | 1/2004 | Yee et al. | 60/777 |
| 2004/0206090 A1 * | 10/2004 | Yee et al. | 60/777 |
| 2004/0206091 A1 * | 10/2004 | Yee et al. | 60/777 |
| 2004/0255588 A1 * | 12/2004 | Lundberg et al. | 60/723 |

OTHER PUBLICATIONS

Lefebvre, A. H. (Sep. 1998). *Gas Trubine Combustion*. Hemisphere Publishing Corporation. (Table of Contents). p. 49 and 192.

* cited by examiner

CONTROL STRATEGY FOR FLEXIBLE CATALYTIC COMBUSTION SYSTEM

RELATED APPLICATION

This application is a regular application of, and claims the benefit of priority from U.S. Provisional Patent Application No. 60/262,282 filed Jan. 16, 2001, the full disclosure of which is incorporated herein by reference.

BACKGROUND OF THE INVENTION

In a conventional gas turbine engine, the engine is controlled by monitoring the speed of the engine and adding a proper amount of fuel to control the engine speed. Specifically, should the engine speed decrease, fuel flow is increased thus causing the engine speed to increase. Similarly, should the engine speed increase, fuel flow is decreased causing the engine speed to decrease. In this case, the engine speed is the control variable or process variable monitored for control.

A similar engine control strategy is used when the gas turbine is connected to an AC electrical grid in which the engine speed is held constant as a result of the coupling of the generator to the grid frequency. In such a case, the total fuel flow to the engine may be controlled to provide a given power output level or to run to maximum power with such control based on controlling exhaust gas temperature or turbine inlet temperature. Again, as the control variable rises above a set point, the fuel is decreased. Alternatively, as the control variable drops below the set point, the fuel flow is increased. This control strategy is essentially a feedback control strategy with the fuel control valve varied based on the value of a control or process variable compared to a set point.

In a typical combustion system using a diffusion flame burner or a simple lean premixed burner, the combustor has only one fuel injector. In such systems, a single valve is typically used to control the fuel flow to the engine. In more recent lean premix systems however, there may be two or more fuel flows to different parts of the combustor, with such a system thus having two or more control valves. In such systems, closed loop control is based on controlling the total fuel flow based on the required power output of the gas turbine while fixed (pre-calculated) percentages of flow are diverted to the various parts of the combustor. The total fuel flow will change over time.

In addition, the desired fuel split percentages between the various fuel pathways (leading to various parts of the combustor) may either be a function of certain input variables or they may be based on calculation algorithms using process inputs such as temperatures, air flow, pressures etc. Such control systems offer ease of control due primarily to the very wide operating ranges of these conventional combustors and the ability of the turbine to withstand short spikes of high temperature without damage to various turbine components. Moreover, the fuel/air ratio fed to these combustors may advantageously vary over a wide range with the combustor remaining operational. A wide variety of such control strategies can be employed and a number of these have been described in the literature.

A properly operated catalytic combustion system can provide significantly reduced emissions levels, particularly of NOx. Unfortunately, however, such systems may have a much more limited window of operation compared to conventional diffusion flame or lean premix combustors. For example, fuel/air ratios above a certain limit may cause the catalyst to overheat and lose activity in a very short time. In addition, the inlet temperature may have to be adjusted as the engine load is changed or as ambient temperature or other operating conditions change.

SUMMARY OF THE INVENTION

In accordance with the present invention, an improved control system is provided for a catalytic combustion system comprising a flame combustor, a fuel injector positioned downstream of the flame combustor and a catalyst positioned downstream of the fuel injector. In such systems, a portion of the fuel combusts within the catalyst itself and a remainder of the fuel combusts in a homogeneous combustion process wave downstream of the catalyst.

In another aspect, the present invention provides an improved control system for a catalytic combustion system comprising a heat exchanger that uses either exhaust gas or process exhaust heat to increase the temperature of the air entering a combustor, a fuel injector positioned downstream of the heat exchanger and a catalyst positioned downstream of the fuel injector, wherein a portion of the fuel combusts within the catalyst and a remainder of the fuel combusts in the region downstream of the catalyst.

In preferred aspects, the present invention provides methods of controlling a catalytic combustion system comprising a flame burner, a fuel injector positioned downstream of the flame burner and a catalyst positioned downstream of the fuel injector, wherein a portion of the fuel combusts within the catalyst and a remainder of the fuel combusts in the region downstream of the catalyst, comprising: determining the fuel air ratio at the catalyst inlet; and adjusting the gas temperature at the catalyst inlet to a preferred value based upon a predetermined schedule between the fuel air ratio and the gas temperature at the catalyst inlet.

In other preferred aspects, the present invention provides methods of controlling a catalytic combustion system comprising a flame burner, a fuel injector positioned downstream of the flame burner and a catalyst positioned downstream of the fuel injector, wherein a portion of the fuel combusts within the catalyst and a remainder of the fuel combusts in the region downstream of the catalyst, comprising: determining the adiabatic combustion temperature at the catalyst inlet; and adjusting the gas temperature at the catalyst inlet to a preferred value based upon a predetermined schedule between the adiabatic combustion temperature and the gas temperature at the catalyst inlet.

In other preferred aspects, the present invention provides methods of controlling a catalytic combustion system comprising a flame burner, a fuel injector positioned downstream of the flame burner and a catalyst positioned downstream of the fuel injector, wherein a portion of the fuel combusts within the catalyst and the remainder of the fuel combusts in the region downstream of the catalyst comprising: measuring the exhaust gas temperature; and adjusting the catalyst inlet gas temperature to a preferred value based upon a predetermined schedule that relates the catalyst inlet gas temperature to the difference between the measured exhaust gas temperature and the calculated exhaust gas temperature at full load.

In those aspects of the invention in which a heat exchanger is used, (and a flame burner may not be used), the present invention also provides methods controlling a catalytic combustion system. Such methods may comprise determining the fuel air ratio at the catalyst inlet; and adjusting the catalyst inlet gas temperature to a preferred value based upon a predetermined schedule between the fuel air ratio at the catalyst inlet and the temperature at the catalyst inlet by adjusting the fraction of combustion air or the fraction of exhaust flowing through the heat exchanger.

Alternatively, such methods may comprise: determining the adiabatic combustion temperature at the catalyst inlet; and adjusting the catalyst inlet gas temperature to a preferred value based upon a predetermined schedule between the adiabatic combustion temperature at the catalyst inlet and the temperature at the catalyst inlet by adjusting the fraction of combustion air or the fraction of exhaust flowing through the heat exchanger.

In preferred aspects, the present invention also provides methods of controlling a catalytic combustion system comprising a flame burner, a fuel injector positioned downstream of the flame burner and a catalyst positioned downstream of the fuel injector, wherein a portion of the fuel combusts within the catalyst and the remainder of the fuel combusts in the region downstream of the catalyst comprising: measuring the exhaust gas temperature; and adjusting the catalyst inlet gas temperature to a preferred value based upon a predetermined schedule that relates the catalyst inlet gas temperature to the difference between the measured exhaust gas temperature and the calculated exhaust gas temperature at full load.

In preferred aspects, the gas temperature at the catalyst inlet may be adjusted by changing the fuel flow to the flame burner. In most preferred aspects, the gas temperature at the catalyst inlet is adjusted by changing the percentages of fuel split between the flame burner and the injector. In these aspects, the exhaust gas temperature may be measured with a thermocouple measuring the gas temperature downstream of the process, or with a thermocouple monitoring the temperature of the gas at the catalyst inlet.

In addition, the present invention also provides a method of control comprising: determining the fuel air ratio at the catalyst inlet; and adjusting the catalyst inlet gas temperature to a preferred value based upon a predetermined schedule between the fuel air ratio and the temperature at the catalyst inlet. Such predetermined schedule may be represented as an operating line which may be stored in the control system as a look up table or as a mathematical function. System control is maintained by operating the combustion system at, or near, a preferred set of conditions defined by the predetermined schedule. In other words, system control is achieved by operating the system at a preferred set of operating conditions defined by a predetermined "operating line" schedule of data points.

In one preferred aspect, the predetermined schedule defines an "operating line" relationship between fuel air ratio and the gas temperature at the catalyst inlet. In alternate preferred aspects, the predetermined schedule defines an "operating line" relationship between the adiabatic combustion temperature and the gas temperature at the catalyst inlet. In alternate preferred aspects, the predetermined schedule defines an "operating line" relationship between the catalyst inlet gas temperature and the difference between the measured exhaust gas temperature and the calculated exhaust gas temperature at full load (called $EGT_{delta}$).

In preferred aspects, the initial construction of the predetermined schedule(s) may comprise defining or detecting or reading a set of preferred "operating points", wherein these operating points reflect conditions at which system emissions are minimal under various operating conditions. In various aspects, these operating points can be stored as a look-up table or other predetermined schedule of values. Such operating points may also be defined by a functional (i.e. mathematical) relationship known as an "operating line" (which when plotted, appears as a line passing through and joining the various operating points, for example as a preferred operating line on a "catalyst inlet gas temperature" vs. "fuel air ratio" graph).

It is to be understood that system control in accordance with the present invention comprises operating the system at, or near, conditions defined by an operating line data set wherein a first variable (e.g. the fuel air ratio value at the catalyst inlet) is used to specify a second variable (e.g. the catalyst inlet gas temperature) with the control system acting to control this second variable to the specified value by adjusting fuel flow to the flame burner. An advantage of the present system is that it can be used to control the operation of a gas turbine/catalytic combustion system, allowing the gas turbine to start up and operate over a wide load range with very low emissions.

As stated above, system control is maintained by operating the system according to a predetermined schedule of data points describing a preferred relationship between two system operating variables (e.g.: catalyst inlet gas temperature and fuel air ratio). Preferably, catalyst inlet gas temperature is thus adjusted based upon sensed or calculated fuel air. Alternatively, the predetermined schedule of data points may describe a preferred relationship between adiabatic combustion temperature and catalyst inlet gas temperature; or between, the catalyst inlet gas temperature and the difference between the measured exhaust gas temperature and the calculated exhaust gas temperature at full load (called $EGT_{delta}$).

In one preferred approach, the catalyst inlet gas temperature is varied by changing the fraction of fuel fed to the flame combustor (with the remaining fuel then fed to the catalyst). In preferred aspects, this relationship is dependent on parameters from the turbine system such as total fuel to the gas turbine, and the fuel to air ratio at some location in the turbine, or measured temperatures such as exhaust gas temperature or other parameters. Specifically, the present control system may vary the percentages of fuel which are split into various parts of the combustor system. For example, the percentages of fuel directed to each of the flame combustor and fuel injector may be varied. For example, directing a greater percentage of fuel into the flame combustor will increase the temperature at the catalyst inlet. Conversely, decreasing the percentage of fuel into the flame combustor will decrease the temperature at the catalyst inlet.

In optional alternate preferred aspects, the predetermined schedule which is used is selected from among a family of predetermined schedules and in which the selection is based upon the location of the homogeneous combustion process wave under different operating conditions. This selection of an appropriate predetermined schedule is continuously or periodically "updated" over time as the homogeneous combustion process wave moves. Specifically, in accordance with the present invention, the selection of the preferred schedule is based upon sensing the location of the homogeneous combustion process wave, and then selecting a preferred predetermined schedule (e.g.: between the fuel air ratio and the temperature at the catalyst inlet) from among a family of such predetermined schedules. As the homogeneous combustion process wave moves over time, the predetermined (operating line) schedule is updated by selecting a new operating line from among the family of predetermined operating schedules. By revising or updating the operation of the system to operate at various new predetermined schedules over time, the homogeneous combustion process wave can be maintained (or returned) to a preferred position downstream of the catalyst.

This optional second aspect of the present invention may thus comprise methods of controlling a catalytic combustion system comprising a flame burner, a fuel injector positioned downstream of the flame burner and a catalyst positioned downstream of the fuel injector, wherein a portion of the fuel combusts within the catalyst and the remainder of the fuel combusts in the region downstream of the catalyst in a homogeneous combustion process wave comprising: positioning a sensor to monitor the region downstream of the catalyst, the sensor having an output signal responsive to the location of the homogeneous combustion process wave; and using the sensor signal to adjust the catalyst inlet gas temperature to control the position of the homogeneous combustion process wave.

In preferred aspects, using the sensor signal to adjust catalyst inlet gas temperature may comprise adjusting the catalyst inlet gas temperature based upon a predetermined schedule between the measured exhaust gas temperature and the calculated exhaust gas temperature at full load; and modifying the predetermined schedule based upon the sensor signal.

Alternatively, using the sensor signal to adjust catalyst inlet gas temperature may comprise adjusting the catalyst inlet gas temperature based upon a predetermined schedule between the fuel air ratio and the catalyst inlet gas temperature; and modifying the predetermined schedule based upon the sensor signal.

Alternatively, using the sensor signal to adjust catalyst inlet gas temperature may comprise adjusting the catalyst inlet gas temperature based upon a predetermined schedule between the adiabatic combustion temperature and the catalyst inlet gas temperature; and modifying the predetermined schedule based upon the sensor signal.

Alternatively, using the sensor signal to adjust catalyst inlet gas temperature may comprise adjusting the catalyst inlet gas temperature based upon a predetermined series of schedules between the adiabatic combustion temperature and the catalyst inlet gas temperature; and selecting the predetermined schedule from among the series of schedules based upon the sensor signal.

Alternatively, using the sensor signal to adjust catalyst inlet gas temperature may comprise adjusting the catalyst inlet gas temperature based upon a predetermined schedule between the fuel air ratio and the catalyst inlet gas temperature; and modifying the predetermined schedule based upon the sensor signal.

Alternatively, using the sensor signal to adjust catalyst inlet gas temperature may comprise adjusting the catalyst inlet gas temperature based upon a predetermined series of schedules between the fuel air ratio and the catalyst inlet gas temperature; and selecting the predetermined schedule from among the series of schedules based upon the sensor signal.

Alternatively, using the sensor signal to adjust catalyst inlet gas temperature may comprise adjusting the catalyst inlet gas temperature based upon a predetermined schedule that relates the difference between: (i) the measured exhaust gas temperature and the calculated exhaust gas temperature at full load, and (ii) the catalyst inlet gas temperature; and modifying the predetermined schedule based upon the sensor signal.

Alternatively, using the sensor signal to adjust catalyst inlet gas temperature may comprise adjusting the catalyst inlet gas temperature based upon a predetermined series of schedules that relates: (i) the difference between the measured exhaust gas temperature and the calculated exhaust gas temperature at full load, and (ii) the catalyst inlet gas temperature; and selecting the predetermined schedule from among the series of schedules based upon the sensor signal.

The second optional approach of revising system operation to new predetermined schedules over time is particularly advantageous as follows.

It has been found that during long term operation, the catalyst may age and the overall catalyst performance may change. In addition, the turbine specifications may change over time. For example, the compressor may become fouled, thereby altering the desired operating conditions of the catalyst. Also, the composition of the fuel may change again modifying the performance of the catalytic combustion system. Unfortunately, these types of changes move the preferred operating line (which defines a preferred set of system operating conditions to achieve minimal emissions) over time.

In accordance with this optional second aspect of the present invention, one or more sensors may be used to determine the position of a homogeneous combustion wave downstream of the system catalyst. In preferred aspects, sensor(s) may optionally comprise ultraviolet sensor(s) in the post catalyst combustion zone, ion sensors, carbon monoxide sensors or temperature sensors. In alternative preferred aspects, the carbon monoxide or hydrocarbon sensors can be located in the exhaust downstream of the power turbine. By determining the position of the combustion wave, such that movement of the homogeneous combustion wave can be measured, the present control system can be used to "update" the operating line (i.e. switch to a new predetermined operating line schedule) over time. In other words, the present invention may optionally revise its selection of preferred predetermined operating line schedule. Change in the position of the homogeneous combustion wave over time is thus indicative of a change in the position of the desired system operating line. Accordingly, the present control system calculates which operating line should be used (by determining the change in the combustion wave location) and then instructs the system to operate at conditions defined by the "updated" operating line.

In accordance with the second aspect of the present invention, the present invention provides a catalytic combustion control system which is thus adapted to track changes of catalyst performance over time and to then update system operation to a new operating line (i.e.: select a new operating schedule from among a family of predetermined operating schedules). This, in effect varies system operating conditions to move the location of a homogeneous combustion process wave back to a desired location which is neither too far upstream (i.e.: near the catalyst), nor too far downstream (i.e.: near the turbine inlet).

It is to be understood that, as used herein, the "operating line" is the relationship between any two or more system parameters which is exhibited when minimal emissions conditions and good catalyst and system durability are achieved. In preferred aspects, the operating line defines a preferred relationship between the fuel-air ratio at the catalyst inlet and the gas mixture temperature at the catalyst inlet. As such, the predetermined schedule comprises an "operating line" relationship between: (i) the fuel air ratio at the catalyst inlet and (ii) the temperature of the gas mixture fed to the catalyst, when minimal emissions conditions are achieved.

In another example, the operating line relates the temperature of the gas mixture at the catalyst inlet gas temperature to the adiabatic combustion temperature at the catalyst inlet.

In yet another example, the operating line is the relationship between: (i) the difference between the turbine exhaust gas temperature and the calculated exhaust gas temperature at 100% load, and (ii) the temperature of the gas mixture at the catalyst inlet.

Preferably, the operating line also defines system conditions during gas turbine start up, loading and full load operating.

In accordance with the present invention, one or more sensors may be used to periodically (or continuously) re-determine the location of the homogeneous combustion process wave, such that system operation may be controlled to move the homogeneous combustion process wave to a preferred location. As such, the present system periodically (or continuously) tracks changes of a catalyst operation specification and then shifts system operation by "updating" to a new operating line (ie: selecting a new operating schedule from among a family of predetermined schedules). Accordingly, the operating line (i.e.: the preferred relationship between the fuel air ratio and the temperature at the catalyst inlet at which minimal emissions occur) can be periodically (or continuously) updated to achieve reduced (or preferably, minimal) emissions as the catalyst changes performance with time.

In accordance with this optional second aspect of the present invention, periodic monitoring of the location of the homogeneous combustion process wave is carried out. The timing of such updating of the functional relationship between fuel air ratio and gas temperature can be done on a predetermined fixed schedule or the system performance can be continuously monitored and the controlling functional relationship continuously modified. If a sufficiently large deviation in the position of the wave is detected, (from a desired position), system operation is "updated" to function at a new operating line thus bringing the homogeneous combustion process wave back to a desired location. Stated another way, system operation can be updated to operate at or near positions along a new predetermined schedule (i.e. by selecting a desired predetermined schedule from among a family of predetermined schedules). For example, in instances where the operating line is defined by the relationship between: (i) the fuel air ratio at the catalyst inlet, and (ii) the temperature at the catalyst inlet, this relationship can be updated either by changing: (i) the fuel air ratio values, or (ii) the catalyst inlet gas temperature values.

It is to be understood that "updating" the operating line schedule may variously comprise either: (i) modifying the predetermined schedule based on the sensor signal (i.e.: calculating a new operating line), or (ii) selecting a predetermined schedule from among a series or family of such predetermined schedules (i.e.: selecting a new "pre-calculated" operating line).

In one exemplary aspect of the present invention, the operating line is fixed line (i.e.: a known series of data points) that may be coded into (i.e.: stored within) the present control system as a fixed preferred operating condition relationship between fuel air ratio and catalyst inlet gas temperature. Such an operating line can be defined either in a look-up table format, or by one or more pre-stored equations.

In accordance with the present invention, the predetermined schedule (or schedules) relating the fuel air ratio and the catalyst inlet gas temperature may be based on schedules, lookup tables or mathematical functions stored in the memory of a computerized control system which controls the system operation using this information. Optionally, additional information can be input into the computerized control system such as temperatures, fuel or air flow rates, load and other values. In preferred aspects, the calculation speed of the control system is sufficiently fast such that the control system can react very quickly to changes in the process and can thus provide very good control of the process.

In those aspects of the invention in which a heat exchanger is used (instead of or in addition to a flame burner) the exhaust gas from the process can be passed through one side of a heat exchanger while the gas flowing to the combustion process passes through the other side of the heat exchanger. In this manner, the air flowing to the combustion process can be heated. By varying the amounts or fraction of exhaust and/or combustion air flowing through the heat exchanger, the temperature of the gas entering the combustion process and the catalyst can be varied.

BRIEF DESCRIPTION OF THE DRAWINGS

FIG. 4B showing the homogeneous combustion process wave positioned undesirably close to the turbine inlet; and FIG. 4C showing the homogeneous combustion process wave positioned undesirably close to the catalyst.

DESCRIPTION OF THE SPECIFIC EMBODIMENTS

Figure 1:
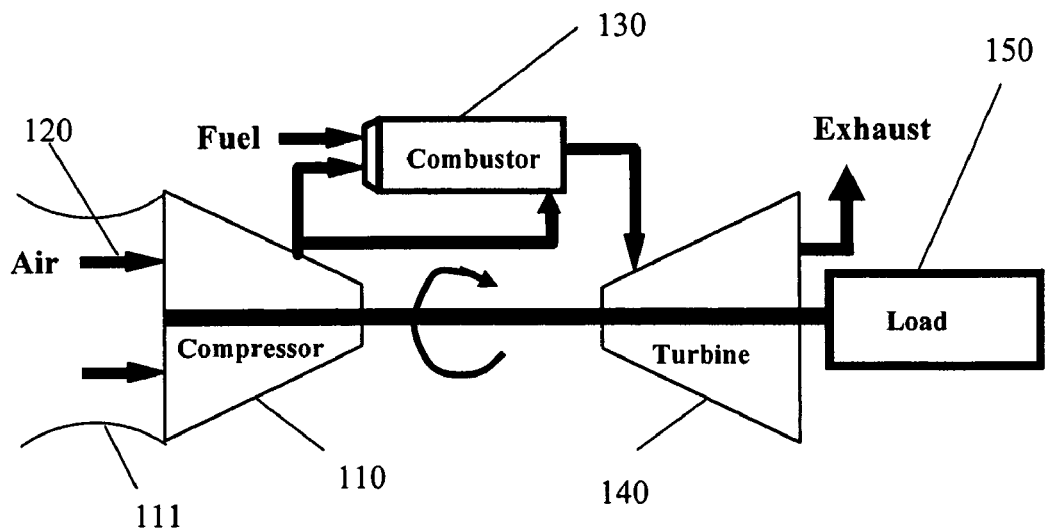
FIG. 1 is an example of a typical existing gas turbine system.

FIG. 1 schematically shows an example of a typical existing gas turbine employing a catalytic combustion system. In this system, compressor 110 ingests ambient air 120 through compressor bellmouth 111, and compresses this air to a high pressure and then drives the compressed air, at least in part, through the combustor 130 and then through the drive turbine 140. Combustor 130 combines fuel and the air and combusts this mixture to form a hot high velocity gas stream that flows through the turbine 140 which provides the power to drive the compressor and the load 150 such as a generator.

Figure 2:
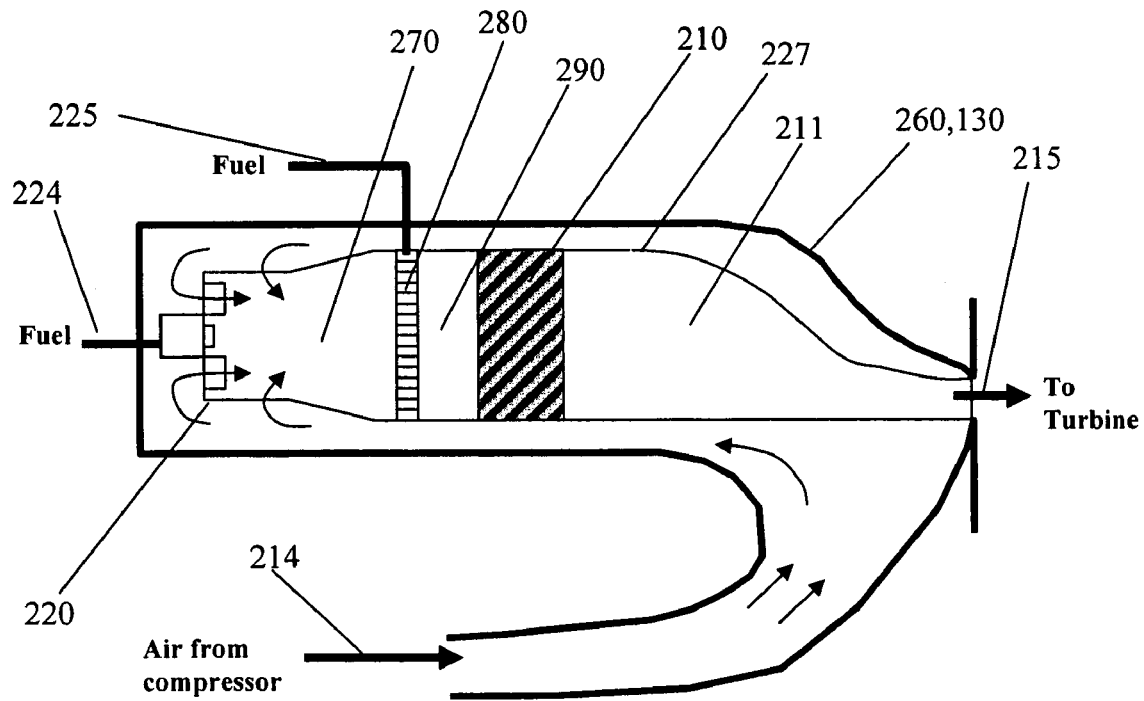
FIG. 2 is a close-up sectional view of the combustor (element 130) of the system of FIG. 1 configured as a catalytic combustion system with a flame combustor upstream of the catalyst.

FIG. 2 is a close-up view of combustor 130 of FIG. 1. Specifically, as shown in FIG. 2, a catalytic combustor 260 is provided. Catalytic combustor 260 comprises four major elements that are arrayed serially in the flow path. Specifically, these four elements include a flame burner 220 (which is positioned upstream of the catalyst and which produces a hot gas mixture 270), a fuel injection and mixing system 280, a catalyst 210 and a burnout zone 211. The exiting hot gases from the combustion system flow into the drive turbine 215 which produces power to drive a load. In preferred aspects, there are two independently controlled fuel streams, with one stream 224 directed to a flame burner 220 and the other stream 225 being directed to the catalyst fuel injection and mixing system 280, as shown.

Catalytic combustor 260 operates in the following manner. The majority of the air from the gas turbine compressor discharge 214 flows through the flame burner 220 and catalyst 210. Flame burner 220 functions to help start up the gas turbine and to adjust the temperature of the air and fuel mixture to the catalyst at location 290 to a level that will support catalytic combustion of the main fuel stream 225, which is injected and mixed with the flame burner discharge gases (by catalyst fuel injection and mixing system 225) prior to entering catalyst 210. In various aspects, catalyst 210 may consist of either a single stage or a multiple stage catalyst.

Partial combustion of the fuel/air mixture occurs in catalyst 210, with the balance of the combustion then occurring in the burnout zone 211, (i.e.: downstream of the exit face of catalyst 210). Typically, 10%–90% of the fuel is combusted in catalyst 210. Preferably, to fit the general requirements of the gas turbine operating cycle including achieving low emissions, while obtaining good catalyst durability, 20%–70% is combusted in catalyst 210, and most preferably between about 30% to about 60% is combusted in catalyst 210.

Figure 3:
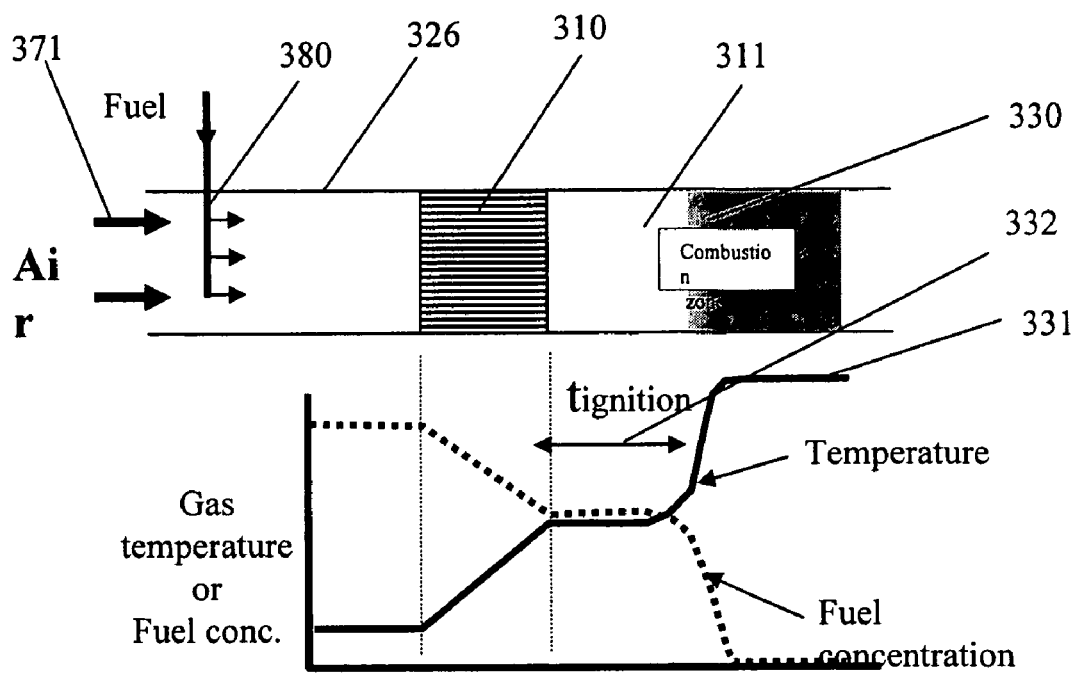
FIG. 3 is an example of a typical existing partial combustion catalytic system in operation, with a corresponding temperature and fuel concentration graph positioned therebelow.

Reaction of any remaining fuel not combusted in the catalyst and the reaction of any remaining carbon monoxide to carbon dioxide occurs in burnout zone 211, thereby advantageously obtaining higher temperatures without subjecting the catalyst to these temperatures and obtaining very low levels of unburned hydrocarbons and carbon monoxide. After complete combustion has occurred in burnout zone 211, any cooling air or remaining compressor discharge air is then introduced into the hot gas stream, (i.e.: at 215, typically just upstream of the turbine inlet). In addition, if desired, air can optionally be introduced through liner wall 227 at a location close to the turbine inlet 215 as a means to adjust the temperature profile to that required by the turbine section at location 215. Such air introduction to adjust the temperature profile is one of the design parameters for power turbine 215. Another reason to introduce air through liner 227 in the region near the turbine 215 would be for turbines with very low inlet temperatures at 215. For example, some turbines have turbine inlet temperatures in the range of 900 to 1200° C., temperatures too low to completely combust the remaining unburned hydrocarbons and carbon monoxide. In these cases, a significant fraction of the air can be diverted through the liner 227 in the region near turbine 215. This would raise the temperature in region 211 thus allowing fast and complete combustion of the remaining fuel and carbon monoxide FIG. 3 shows an example of a typical existing partial combustion catalyst system corresponding to the system shown in FIGS. 1 and 2. In such systems, only a portion of the fuel is combusted within the catalyst and a significant portion of the fuel is combusted downstream of the catalyst in a post catalyst homogeneous combustion zone. Examples of partial combustion catalyst systems and approaches to their use have been described in prior patents, for example: U.S. Pat. No. 5,183,401 to Dalla Betta et al.; U.S. Pat. No. 5,232,357 to Dalla Betta et al.; U.S. Pat. No. 5,250,489 to Dalla Betta et al.; U.S. Pat. No. 5,281,128 to Dalla Betta et al.; and U.S. Pat. No. 5,425,632 to Tsurumi et al.

In the description of such partial combustion catalytic systems set forth herein, the following terms are understood to have the following meanings:

(1) "Adiabatic combustion temperature": The temperature of a fuel and air mixture after all of the fuel in the mixture has been combusted with no thermal energy lost to the surroundings, with the thermal energy instead being used to raise the temperature of the components of the gas mixture.

(2) "Fuel air ratio": The ratio of the total fuel to total air expressed as either a volumetric ratio or a mass ratio. This ratio can be calculated either from the composition of a static or fixed gas mixture as the actual mixture composition or from a flowing gas mixture as the ratio of flows of fuel and air.

(3) "Post catalyst reaction zone": The portion of the flow path just downstream of the catalyst but before any additional air introduction and before the turbine where the gas mixture exiting the catalyst can undergo further reaction.

(4) "Ignition delay time" ($T_{ignition}$): The time period from when the hot gases exit the catalyst until they fully combust the remaining fuel content.

(5) "Homogeneous combustion zone" or "Homogeneous combustion process wave": The region downstream of the catalyst wherein the remaining uncombusted fuel exiting the catalyst is combusted.

(6) "Exhaust gas temperature": The temperature of the gas mixture exiting the process after the work has been extracted. In the case of a gas turbine, this is the temperature of the gas just downstream of the power turbines typically connected to the load.

(7) "Exhaust gas temperature delta" ($EGT_{delta}$): The numerical difference between the exhaust gas temperature at any time and the calculated exhaust gas temperature at full load.

In FIG. 3, (which is a linear schematic representation of a typical partial combustion catalytic system with the gas temperature and fuel concentrations at various locations along the flow path shown there below), air 370 enters a fuel injection and mixing system 380 which injects fuel into the flowing air stream.

A portion of the fuel is combusted in the catalyst 310 resulting in an increase in temperature of the gas mixture as it passes through catalyst 310. As can be seen, the mixture exiting catalyst 310 is at an elevated temperature. This fuel/air mixture contains remaining unburned fuel which undergoes auto-ignition in the post catalyst reaction zone 311. Specifically, the fuel is combusted to form the final reaction products of $CO_2$ and $H_2O$ with the temperature rising to the final combustion temperature 331 at homogeneous combustion process wave 330. The resulting hot, high energy gases (in post catalyst reaction zone 311) then drive the power turbine (140 in FIG. 1) and load (150 in FIG. 1).

The lower portion of FIG. 3 shows a graph with the gas temperature indicated on the ordinate with the position along the combustor indicated on the abscissa with the position corresponding to the linear combustor diagram directly above it. As can be seen, the gas temperature shows a rise as the mixture passes through catalyst 310. Downstream of catalyst 310, however, the mixture temperature is constant for some period, referred to as the ignition delay time 332, $T_{ignition}$, and then the remaining fuel combusts (at homogeneous combustion process wave 330) to raise the temperature further.

Figure 4:
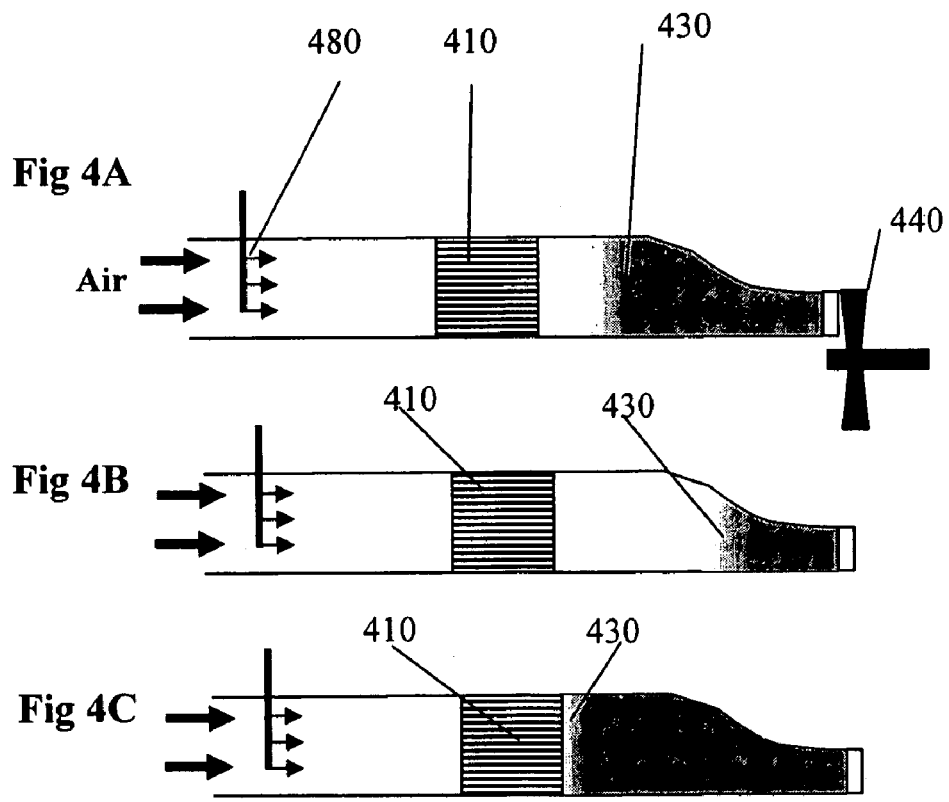
FIGS. 4A, 4B and 4C correspond to FIG. 3, but show a homogeneous combustion process wave at three different locations, with FIG. 4A showing a preferred location for the homogeneous combustion process wave.

FIGS. 4A, 4B and 4C are similar to FIG. 3, but show a homogeneous combustion process wave (430) at three different locations, as follows. As illustrated in FIG. 4A, the preferred position of homogeneous combustion wave 430 is within the region just downstream of catalyst 410.

The Applicants have found, unexpectedly, that the position of the homogeneous combustion process wave is not connected to a physical process or a fixed flame holder, but rather is a function of catalyst exit gas conditions.

In accordance with the present invention, therefore, such catalyst exit conditions are controlled such that the position of the homogeneous combustion process wave can be moved/maintained at a preferred location within the post catalyst reaction zone. Preferably, the homogeneous combustion wave is located just downstream of the catalyst but is not so far downstream that a long reaction zone or volume is required. The location of the homogeneous combustion process wave is controlled by increasing the catalyst outlet temperature to move it closer to the catalyst or decreased to move it farther downstream from the catalyst. In this way, the present control system advantageously keeps the catalyst operation within a preferred operating regime for good catalyst durability while maintaining low emissions. Specifically, when operating in such a preferred operating regime, emissions of NOx, CO and unburned hydrocarbons can all be reduced while the durability of the catalyst can be maintained.

In accordance with the present invention, the conditions within the gas turbine/catalytic combustor system are controlled such that the position of homogeneous combustion process wave 430 (similar to 330 of FIG. 3) can be maintained in a preferred location within the post catalyst reaction zone. FIG. 4A illustrates the homogeneous combustion wave 430 positioned at a desired location downstream of catalyst 410 with the actual location of combustion wave 430 controlled by the magnitude of the ignition delay time, $T_{ignition}$ (refer to FIG. 3). As the ignition delay time, $T_{ignition}$, is made longer, homogeneous combustion wave 430 moves downstream toward turbine 440 as shown in FIG. 4B. If homogeneous combustion wave 430 moves too close to turbine 440, then the remaining fuel and carbon monoxide may not have time to fully combust and the emissions will be high. This represents a limiting operating condition for the catalytic combustion system. As such, FIG. 4B illustrates a non-preferred location for combustion wave 4-30. Conversely, as ignition delay time, $T_{ignition}$, is decreased, homogeneous combustion wave 430 moves toward catalyst 410 and the unburned portions of the fuel will have sufficient time to combust, thereby producing low emissions of hydrocarbons and carbon monoxide. This is shown in FIG. 4A.

However, ignition delay time, $T_{ignition}$, cannot be reduced so much that homogeneous combustion wave 430 moves too close to catalyst 410 as shown in FIG. 4C (or inside catalyst 410), because this would expose catalyst 410 to temperatures too high for efficient catalyst operation and result in some reduction in its durability. As such, FIG. 4C illustrates a potentially non-preferred or limiting location for combustion wave 430.

In accordance with the present invention, the catalytic combustor system is controlled such that the position of homogeneous combustion wave 430 is maintained within a preferred range by operating the system at a point on a preferred predetermined schedule of data points (i.e. operating line), wherein the preferred operating line is predetermined by the operating conditions of the catalytic combustor and by the catalyst performance.

In preferred aspects, control of the position of the homogeneous combustion wave 430 is achieved by controlling the percentages (and, optionally, the total amount) of fuel sent to the flame burner (e.g.: fuel line 224 and flame burner 220 of FIG. 2) and the catalyst fuel injection and mixing system (e.g.: fuel line 225 and fuel injection system 280 of FIG. 2). For example, adding fuel to 224 burned more fuel in the flame burner 220 and raises the temperature of the gas mixture at location 290, the catalyst inlet. This raises the temperature at the catalyst outlet and moves the wave upstream. Adding fuel at 280 changes the fuel/air ratio at 290 which will also shift the wave upstream.

For a gas turbine/catalyst combustion system of the type shown in FIG. 2, and for a given range of system operating conditions such as pressure, air flow and fuel composition and for a specific catalyst design, there will be a characteristic "Operating Diagram", wherein a line of points on this diagram represents an "operating line" which corresponds to conditions of lowest emissions.

Such an operating line diagram can initially be determined in a number of different ways.

Figure 5:
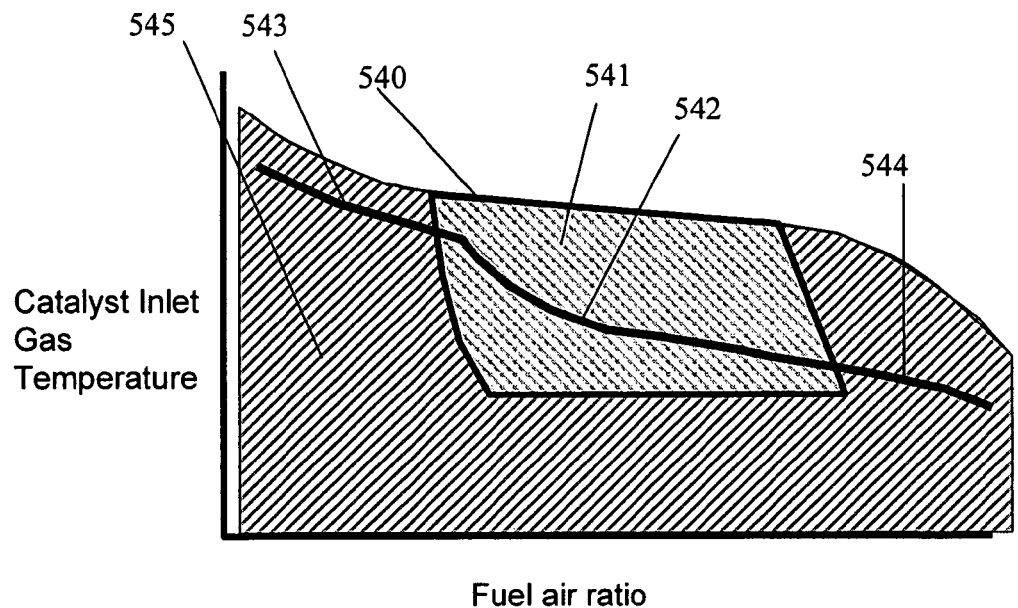
FIG. 5 is an Operating Diagram for a catalytic combustion catalyst represented as a graph of catalyst inlet gas temperature versus fuel air ratio for a typical existing partial combustion catalytic system, showing a preferred operating window, and a preferred operating line.

In a first approach, the catalyst unit may be operated on the actual gas turbine or the gas turbine can be simulated using a full scale combustor test rig or using a subscale combustor test rig. Referring to FIG. 5, a fuel air ratio value is selected to be in the desired region of operation of the gas turbine at some point along the abscissa of FIG. 5. The catalyst inlet gas temperature is then increased by adding fuel to the upstream flame burner until emissions and system performance is acceptable. If this fuel air ratio is within the region 541 then the bottom limit of region 541 is established by low emissions for CO, UHC and NOx. As the catalyst inlet gas temperature is increased further, then the upper limit of region 541 is reached when the catalyst material operating temperature is too high for adequate durability. This process can be repeated for several other values of fuel air ratio and the limits of region 541 can thus be defined. The actual preferred schedule of operating line points (i.e.: the schedule of most preferred operating conditions) can then be established within region 541 by taking into account other variables such as the operating characteristics of the upstream flame combustor or durability of upstream components such as the fuel air mixer 280 in FIG. 2. Once the basic operating line diagram of FIG. 5 represented by line 543, 542 and 544 (using the variable of fuel air ratio and catalyst inlet gas temperature) has been determined, the fuel air ratio can be converted into combustor outlet temperature or turbine inlet temperature or adiabatic combustion temperature using well known relationships.

In another approach, the operating window and the preferred operating line schedule can be calculated based on performance models of the catalyst where the emissions and catalyst material operating temperature are calculated.

In yet another approach, an operating diagram and operating line can be constructed using values of EGT (exhaust gas temperature) delta and catalyst inlet gas temperature taken from measurements on the gas turbine. The $EGT_t$ value may be measured at the process exhaust (i.e.: downstream of turbine 140). The $EGT_{full\ load-t}$ value may then be calculated, and the EGT $delta_t$ value may be calculated by subtracting $EGT_t$ from $EGT_{full\ load-t}$.

In this approach, the catalyst is operated at various loads and measurements are made on the catalyst to insure that it is in an optimal operating regime and that low emissions are achieved. Then $EGT_t$, EGT $delta_t$ and $EGT_{full\ load-t}$ are measured or calculated. This is repeated over the operating load range to establish the operating line. An alternative approach is to use the thermodynamic cycle simulation of the gas turbine and the air splits of the combustor system to actually calculate the catalyst fuel air ratio and the EGT delta. This can be done over the operating load range to define the operating line. It is to be understood that in accordance with the present invention, an "operating diagram" can be used to illustrate the relationship between any two system variables that effectively defines the correct operating regime for the catalyst and post catalyst combustion region, wherein the operating line on such diagram corresponds to conditions of lowest emissions and good system durability.

As explained above, in one preferred aspect of the present invention, the "operating diagram" illustrates the relationship between the catalyst inlet gas mixture temperature (shown along the Y-axis) and the fuel air ratio (shown along the X-axis) of the mixture at the catalyst inlet. In accordance with the present invention, catalyst inlet gas temperature and fuel air ratio can be maintained in a preferred relationship such that the system operates in the low emissions region 541 as shown in FIG. 5. Most preferably, system control is preferably maintained by operating the system at positions along the preferred operating line 542. In preferred aspects, for any given fuel air ratio, the system will be operated so that the catalyst inlet gas temperature is maintained at (or near) a value along operating line 542.

In an alternate preferred approach, operating line 542 can be selectively determined by defining a preferred relationship between Tad and catalyst inlet gas temperature as follows.

The combustor outlet temperature can be calculated from the catalyst inlet gas temperature and the composition of the fuel/air mixture at the catalyst inlet assuming that all of the fuel is combusted. Referring to FIG. 2, the catalyst inlet gas temperature at location 290 and the fuel air ratio at location 290 can be used to calculate the temperature at location 211 assuming all of the fuel is combusted. This temperature is referred to as the adiabatic combustion temperature or sometimes as the adiabatic flame temperature as described by Felder and Rousseau, page 414 (R. M. Felder and R. W. Rousseau, "Elementary Principles of Chemical Processes", John Wiley and Sons, New York, 1978). This calculation, fully described in this reference, uses the known heat of combustion of the fuel or fuel components, the heat capacities of the components of the gas mixture, the composition of the gas mixture and the temperature of the gas mixture to determine the gas temperature after full combustion of the fuel and release of the combustion heat into the gas mixture. This gas temperature is called the adiabatic combustion temperature since it is the temperature rise from the adiabatic release of the heat of combustion (adiabatic meaning that no heat is lost to the external components but is all captured by the gas mixture to raise its temperature). For a given catalyst inlet gas temperature and mixture fuel air ratio, this calculation will result in a unique adiabatic combustion temperature, referred to as Tad. Thus, a diagram such as FIG. 5 can be redrawn wherein the horizontal axis is now the adiabatic combustion temperature, Tad and operating line 542, 543 and 544 relates the catalyst inlet gas temperature to the adiabatic combustion temperature of the gas mixture.

Rather than use a calculated temperature at location 211 in FIG. 2, the actual temperature can be measured in region 211 after the remaining fuel exiting the catalyst has been combusted using a variety of means such as thermocouples, optical sensors and other devices. In addition, a temperature further downstream in the process can be measured and then the combustor outlet temperature calculated assuming temperature losses in the intervening stages. For example, the temperature at the turbine inlet 215 can be measured and then corrected for any added pattern or cooling air to estimate the temperature at location 211.

The adiabatic combustion temperature at location 211 in FIG. 2 can also be calculated from the temperature of the gas stream at location 214, the air flow through the combustor at location 290 and the sum of the fuel inputs at 224 to the flame burner 220 and fuel input 225 to fuel air mixer 280. Thus, the desired operating line for the process can be specified as a functional relationship between: (a) the adiabatic combustion temperature at location 211 calculated from the gas temperature at 214, the air flow through location 290 and the total fuel feed to the process and (b) the temperature at the catalyst inlet, location 290.

Each or the functional relationships described above use the gas temperature at the catalyst inlet, location 290 in FIG. 2. However, this functional relationship can be specified in terms of the temperature at location 270 since the temperature at location 290 can be calculated from: (a) the temperature measured at location 270, (b) the mass gas flow rate at location 270 and (c) the fuel flow 225. Alternatively, when the operation window and operating line is defined by tests run on the gas turbine system, the actual values at the outlet of the flame burner, location 270 can be measured.

To those experienced in the art, there would be numerous other ways to express the basic relationship of catalyst inlet gas temperature and catalyst inlet fuel air ratio shown by operating line 543, 542 and 544 in FIG. 5. It is to be understood that all of these essentially similar relationships are incorporated herein and the present control strategy is not be limited to the alternative approaches described herein for expressing the preferred operating line functional relationship.

Surprisingly, the Applicants have determined that the gas turbine power output or the exhaust gas temperature downstream of the power extraction turbine are good indicators of the fuel air ratio at the catalyst. This advantageously allows the definition of an operating line that relates turbine load to catalyst inlet gas temperature or exhaust gas temperature to catalyst inlet gas temperature. Accordingly, knowledge of the air flow or fuel flow to the catalyst is not required to generate such an operating line. This is even more surprising when one considers that the exhaust gas temperature is not in a fixed relationship to the fuel air ratio or adiabatic combustion temperature of the mixture at the catalyst inlet since the temperature drop as the hot gases pass through the drive turbine (140 of FIG. 1) is a function of the load, the mass air flow, the efficiency of the turbine and other variable.

Further, the Applicants have found that the exhaust gas temperature delta (defined as the calculated exhaust gas temperature at full load minus the current exhaust gas temperature value) may be used to specify operation at a preferred point on an operating line.

$$EGT\ delta_t = EGT_{full\ load-t} - EGT_t$$

The exhaust gas temperature at full load ($EGT_{full\ load-t}$) may be calculated from current operating parameters such as ambient temperature and ambient pressure at any time t and represents the expected exhaust gas temperature when the turbine is running at full load (100% load). The current exhaust gas temperature ($EGT_t$) is the measured value of the exhaust gas temperature at any time t. Subtraction of these values gives the EGT $delta_t$ at time t.

In accordance with this control system, operating range diagrams such as FIG. 5 are constructed for various turbine operating phases. For example, during the start up of a gas turbine the pressure within the combustion chamber would be near the ambient pressure or pressure at the turbine air intake. A diagram such as that in FIG. 5 is developed for this general operating condition. Similarly, operating diagrams can be generated for other operating phases where the turbine and catalytic combustion process conditions are quite different. This series of diagrams are then used to generate a safe operating regime, called an operating line, for process control to cover the entire operation from start up to full output or full load. This operating line will combine the needs of the process to operate correctly. For example, a gas turbine will have certain power requirements to operate at a given point in its cycle. To start the engine will require some combustion energy and this combustion energy requirement will change with the rotational speed. To operate at idle, that is running at the required turbine rotor speed and producing no power output, will require some level of fuel combustion. In accordance with the present invention, an operating line will preferably be generated based on the engine fuel requirements in each region of turbine operation.

In accordance with the present invention, operating range diagrams can be generated theoretically based on models of the catalyst performance or on actual tests of the catalyst in subscale or full scale test systems. Alternatively, the operating line can be developed by trial and error from engine tests where the operating limits of the catalyst are known generally and the engine fuel schedule is developed by engine testing. This later approach requires some level of data from catalyst performance measurements to define whether the catalyst is within its "safe operating zone".

The result is a control system operating line or schedule on which the control system operates via feed forward and feed back principles to define an allowable catalyst inlet gas temperature and fuel/air ratio region for various points in the gas turbine operation with the controller schedule consisting of allowable gas temperatures for a given fuel/air ratio at the catalyst inlet.

Returning to FIG. 5, boundaries 540 enclose a region 541. At any point within region 541, it has been found that the catalytic combustor system will give low emissions. Accordingly, system operation within region 541 is preferred. It is to understood, however, that although region 541 describes a preferred low emissions operating region, the catalyst and the gas turbine may also be operated in region 545, (i.e.: outside of low emissions region 541). This may especially be necessary for short periods of time during start up of the gas turbine or at very low load.

In accordance with the present invention, the system is controlled such that operation preferably is carried out within the operating window of region 541. It is, however, even more preferred that system operation be carried out at a location along line operating 542. In accordance with the present invention, system operation is preferably carried out at points along line 542 (i.e.: within region 541) or at points along lines 543 or 544 (i.e.: outside of region 541). Operation along the line 542 is essentially operation according to a schedule since line 542 describes a schedule of predetermined points relating catalyst inlet gas temperature and catalyst inlet fuel air ratio.

Although operation within the region 541 is desired because it provides low emissions, it may not always be possible to operate in this region. For example, during start up of the gas turbine or during low load operation, the turbine may require operation of the catalyst within region 545. Operation on lines 543 or 544 in region 545 is defined by the lowest emissions achievable and by other factors such as safe operation of the catalyst and good catalyst durability. Accordingly, operating at points along operating lines 543 or 544 (being extensions of operating line 542) is thus operation at the preferred operating conditions within region 545. Together, lines 543, 542 and 544 thus define a preferred operating line (ie: preferred system conditions) for the catalyst for the particular gas turbine.

In preferred aspects, the various boundaries of preferred operating window (i.e.: the boundaries between region 541 and region 545 and the region above line 540) may be determined by experimental tests or they can be estimated by semiemperical models of the catalyst or of the catalytic combustion system being used. Such test results can be used to define the boundaries between high emissions operating region 545 and low emissions operating region 541 may be based on performance specifications such as desired emissions levels, maximum operating temperatures and other factors.

In accordance with the present invention, the catalytic combustion system is controlled such that it operates within region 541, wherein the combustion system will advantageously achieve low emissions with the catalyst exhibiting the necessary durability for industrial application.

It is to be understood that in those instances when the present system is controlled such that it operates at a combination of catalyst inlet gas temperature and fuel air ratio outside of the limits of boundaries 540 (i.e. within region 545) then some performance specification may not be met (such as operating temperature limit, system durability, emissions etc). This may be necessary during some portions of the operating cycle such as start up, shut down, or during part load operation or emergency operation, it may be necessary to operate the system within region 545. It is to be understood that although operation in region 545 may not meet emissions requirements or may not meet some other combustor system specification; such operation will not appreciably degrade catalyst durability.

It should be understood that the graph of FIG. 5 illustrates general characteristic functional relationships, and that the specific locations of the lines on the graph (i.e.: boundaries 540, and lines 542, 543 and 544) are typically derived from empirical tests or theoretical analysis under defined turbine operating phases of start-up, idle, ramp-up, and operation at various levels of load. Thus, different gas turbine systems will have different operating diagrams, but in general the operating diagrams will appear similar to that shown in FIG. 5.

In accordance with the present control system, the combustor/catalyst system is preferably operated at, or near, a preferred set of operating conditions which correspond to a point on operating line 542, 543 or 544.

FIG. 5 shows the operating line as a relationship between the catalyst inlet gas temperature and the fuel air ratio at the catalyst inlet. The inlet gas temperature can be measured. The fuel air ratio can be either measured, or it can be calculated from other measured parameters or it can be estimated from other parameters of the gas turbine such as turbine speed, the pressure at the exit of the compressor, ambient temperature and pressure etc. Alternatively, the operating diagram and operating line can be constructed to relate catalyst inlet gas temperature and EGT-delta.

As stated above, it is to be understood that FIG. 5 is merely exemplary of a preferred operating diagram (which defines the relationship between catalyst inlet gas temperature and fuel air ratio). Alternatively, the operating diagram and operating line can also be defined as a relationship between catalyst inlet gas temperature and adiabatic combustion temperature (Tad) at the combustor exit. A third alternative is to define the operating diagram and operating line as the combustor inlet temperature and the split of fuel to each of the sections of the gas turbine since these values can be used to derive the catalyst inlet gas temperature and the fuel air ratio at the catalyst inlet. Those skilled in the art will be able to define any number of other alternative methods to define the operating line and in developing methods to calculate or estimate these values.

In each case, the control system will function to adjust the fuel split within the combustor so that the catalyst inlet gas temperature and catalyst inlet fuel air ratio is at all times on, or as close as possible to, the operating line 543, 542 and 544. This will provide the desired preferred operation.

In those aspects of the invention in which a fuel air ration vs. catalyst inlet gas temperature operating line is used, the fuel air ratio may be determined by monitoring the fuel flow to the fuel injector and the air flow to the combustor. The air flow to the combustor may in turn be determined by measuring the pressure drop across the inlet bell mouth of the compressor, 111 in FIG. 1.

In those aspects of the invention in which adiabatic combustion temperature vs. catalyst inlet gas temperature operating line is used, adiabatic combustion temperature may be determined by monitoring total fuel flow to the combustor, the total air flow to the combustor and the temperature of the gas entering the combustor. Alternatively, Tad may be determined by monitoring the fuel flow to the injector upstream of the catalyst, the total air flow to the combustor and the temperature of the gas entering the injector. Once again, the air flow to the combustor may in turn be determined by measuring the pressure drop across the inlet bell mouth of the compressor.

The performance of a catalyst or other components of the combustion system or turbine in a catalytic combustion system will change over time. Consequently, an operating diagram (such as shown above in FIG. 5) only corresponds to preferred operating conditions at a particular catalyst state. Stated another way, as a catalyst degrades over time, the schedule of data points defining the preferred operating line (i.e.: the preferred conditions at which the system is operated to minimize emissions) will correspondingly tend to change (i.e.: shift in position on the operating diagram). In addition, the performance characteristics of the catalyst system may also be influenced by the operating conditions of the turbine and by the ambient conditions such as air temperature and pressure.

In an optional second aspect of the invention, the present invention provides a novel system for controlling operation of a catalytic combustion system by monitoring the change in the performance of a catalyst over time, and then changing system operation to a new operating line. Specifically, in preferred aspects, the present invention provides a control system which is adapted to correct for a change in the performance of a catalyst by monitoring its change in performance and then shifting system operation to a point on a new operating line to thereby maintain the desired optimum low emissions performance of the catalyst and catalytic combustion system.

There are a number of conditions which would cause the operating line to change, including, but not limited to:

(1) The catalyst activity or performance changing due to aging of the catalyst, deactivation of the catalyst by a contaminant, or other phenomena.

(2) The fuel composition may change and thereby change the ignition delay time. For example, a typical natural gas may have an ignition delay time (e.g.: 332 in FIG. 3) in a desired range such that the desired performance (e.g.: the desired combustor outlet temperature and emissions) of the catalyst and combustor system is achieved. However, if the concentration of higher hydrocarbons such as propane or butane increases in the fuel, then the ignition delay time 332 will become shorter. This may move the system operation outside of the preferred operating region 541 of FIG. 5. Specifically, the homogeneous reaction process wave may be too close to the catalyst and the catalyst durability may be negatively affected.

(3) The turbine components may wear or age such that the turbine system specifications change over time. For example, the turbine compressor may become fouled by contaminants in the inlet air causing a decrease in air flow and an increase in compressor discharge temperature. If the fuel air ratio is determined using an estimated air flow from compressor speed and ambient conditions, then the estimated air flow will be incorrect and the apparent operating line will have moved.

While the three effects described above are only examples, they each clearly show that the present system of optionally periodically monitoring the operation of the catalytic combustion system and then altering system operating conditions to a "new" or "revised" operating line is desirable.

Figure 6:
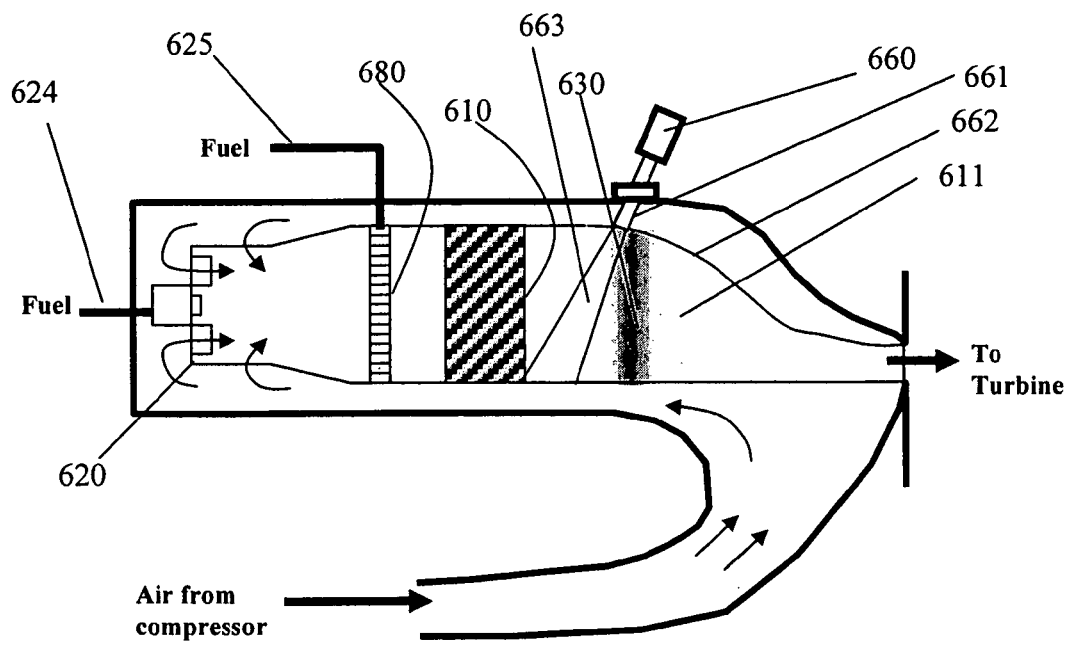
FIG. 6 is a first embodiment of a second aspect the present invention showing a UV sensor viewing the region just downstream of the catalyst.
Figure 7:
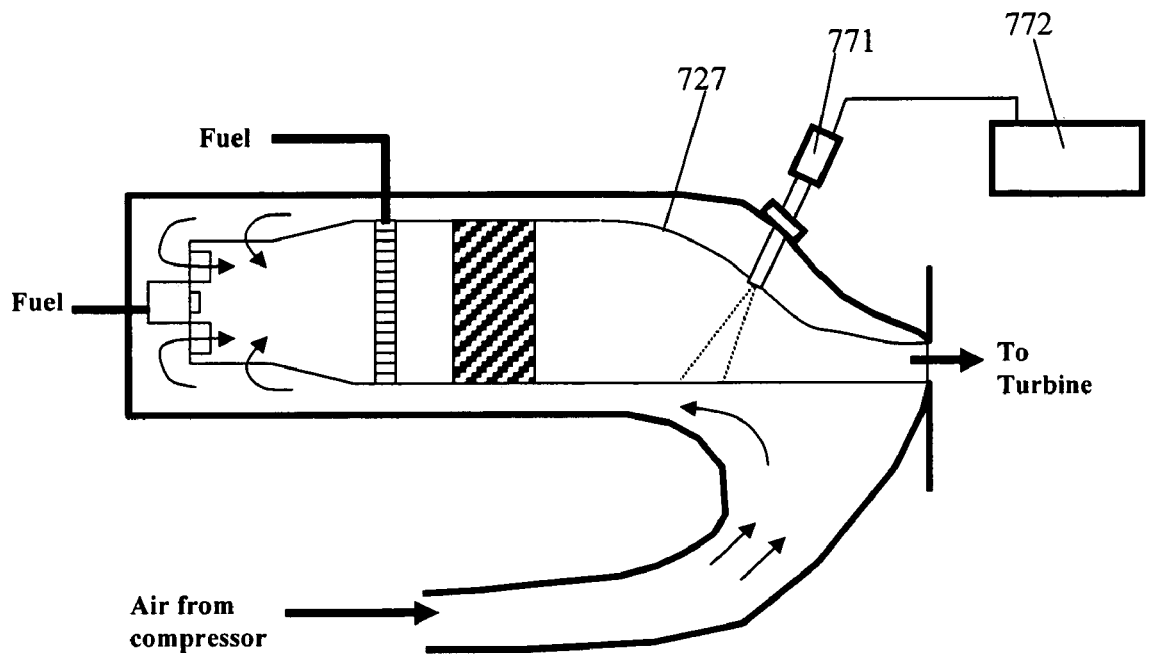
FIG. 7 is a second embodiment of the second aspect of the present invention.
Figure 8:
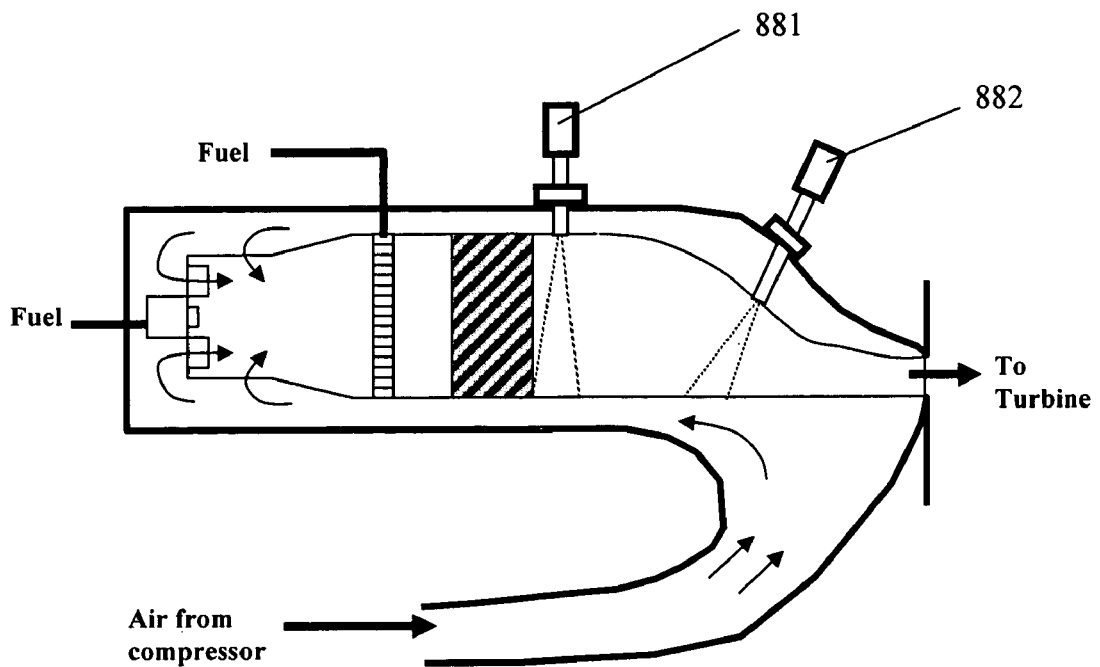
FIG. 8 is a third embodiment of the second aspect of the present invention.

As illustrated in FIGS. 6 to 8, the present invention provides a variety of systems which are adapted to monitor the position/movement of the homogeneous combustion wave downstream of the catalyst. It is to be understood that the present invention is not limited to only those exemplary systems and sensors described herebelow which monitor the position of the post catalyst combustion wave. Rather, any appropriate position monitoring sensor can be used within the scope of the present invention.

In accordance with a first embodiment of the present invention, as set forth in FIG. 6, one approach to monitoring the operation of the catalytic combustion system is to use an optical sensor 660 to determine the location of the homogeneous combustion process wave 630. In one preferred aspect, sensor 660 comprises an ultraviolet sensor which exhibits a response to ultraviolet radiation at a desired wavelength. In one preferred embodiment, sensor 660 may be a solid state device comprising a silicon carbide semiconductor ultraviolet radiation sensitive photodiode that is sensitive to the radiation emitted in a hydrocarbon radial combustion reaction such as that occurring in the post catalyst homogeneous reaction zone.

As shown in FIG. 6, sensor 660 can be positioned to "view" into the post catalyst reaction zone 611. Optionally, sensor 660 may pass through mounting flange 661, extending through an opening in post catalyst reaction zone liner 662 such that it can "view" at an angle into post catalyst reaction zone 611. Sensor 660 collects the optical signal from region 663 of post catalyst reaction zone 611. In particular, sensor 660 may collect the ultraviolet radiation from region 663 and produce an output signal which is proportional to the intensity of ultraviolet radiation it detects. As hot combustion gases containing unburned fuel exits catalyst 610, the mixture ignites after some ignition delay time (i.e. ignition delay time 332 in FIG. 3). If the value of the ignition delay time places the homogeneous combustion wave 630 downstream of the sensor view area 663, then the sensor signal will read essentially zero. As the ignition delay time is shortened by, for example, raising the catalyst inlet gas temperature, then the homogeneous combustion wave will move toward catalyst 610. Therefore, when homogeneous combustion wave is located within the view area 663 of the sensor, then the sensor signal will increase. As more of homogeneous combustion wave moves within sensor view area 663, then the signal from sensor 660 will increase further. In FIG. 6, the sensor is set at an angle so that it covers a wide area of the post catalyst reaction zone. The use of an angled sensor is advantageous in that it is able to best view wave 630 as it moves back and forth within the combustion chamber and can be designed so that the combustion wave does not move too close to the catalyst. Preferably, the sensor is positioned to monitor the region immediately downstream of the exit face of the catalyst.

In optional preferred aspects, the present control system may comprise both: (i) determining the position of the combustion process wave 630, and (ii) moving combustion process wave 630 to a preferred location. As such, the signal from sensor 660 thus provides a mechanism by which the position of the homogeneous combustion wave can be checked or measured such that an appropriate operating line can be selected. For example, sensor 660 can be positioned such that homogeneous combustion wave 630 is located within the sensor view region 663 such that, for example, the sensor signal is 50% of fall scale when the combustion system is operating optimally. Accordingly, if catalyst 610 changes or the combustor system performance changes such that homogeneous combustion wave 630 moves further downstream from the catalyst outlet, then the sensor signal will be less than 50% of full scale. In accordance with the present invention, system operation will be changed such that a new operating can be selected such that the combustion wave 630 is moved back to the previous position with a sensor 660 signal of 50% full scale. In general, this would involve switching to an new operating line positioned upward or to the right of 542 (FIG. 5) since operation along the new operating line would increase the catalyst inlet gas temperature or increase the fuel air ratio and either of these actions would shorten the ignition delay time. Similarly, should combustion process wave 630 move too close to catalyst 610, the signal from sensor 660 then becomes more than 50% of full scale, a new operating line down or to the left of 542 in FIG. 5 would be selected to bring the sensor signal back to 50% of full scale.

Figure 5B:
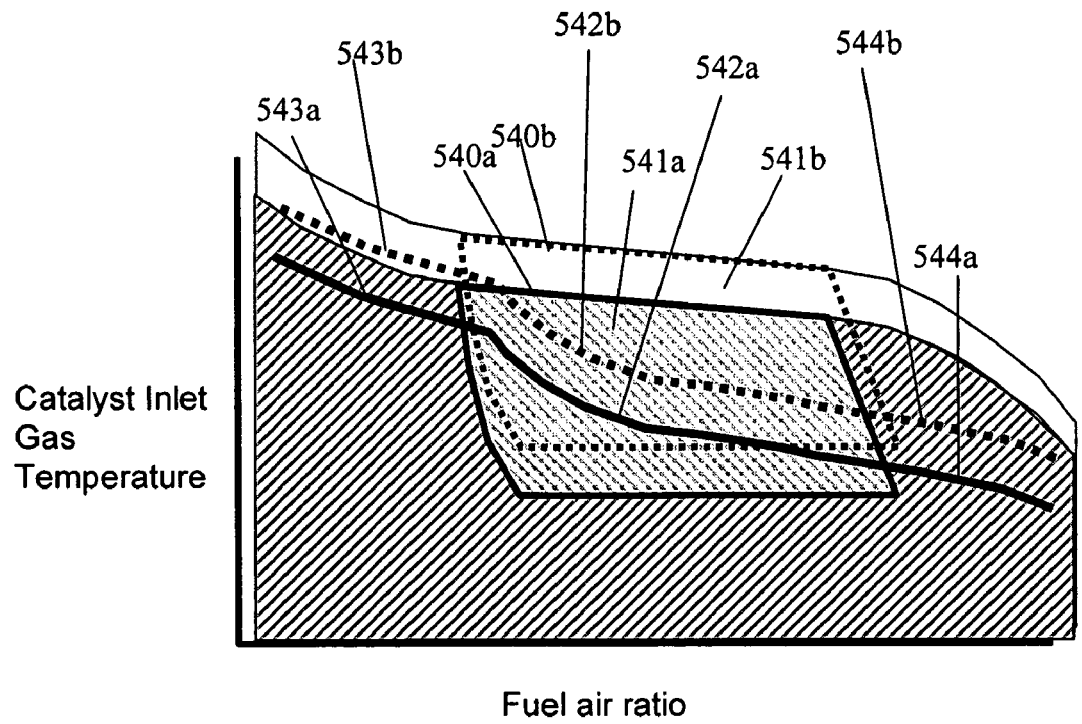
FIG. 5B is an Operating Diagram similar to FIG. 5, but showing two preferred operating lines (wherein system operation is updated from the first to the second operating line in response to the combustion process wave moving to a non-preferred location).
Figure 6B:
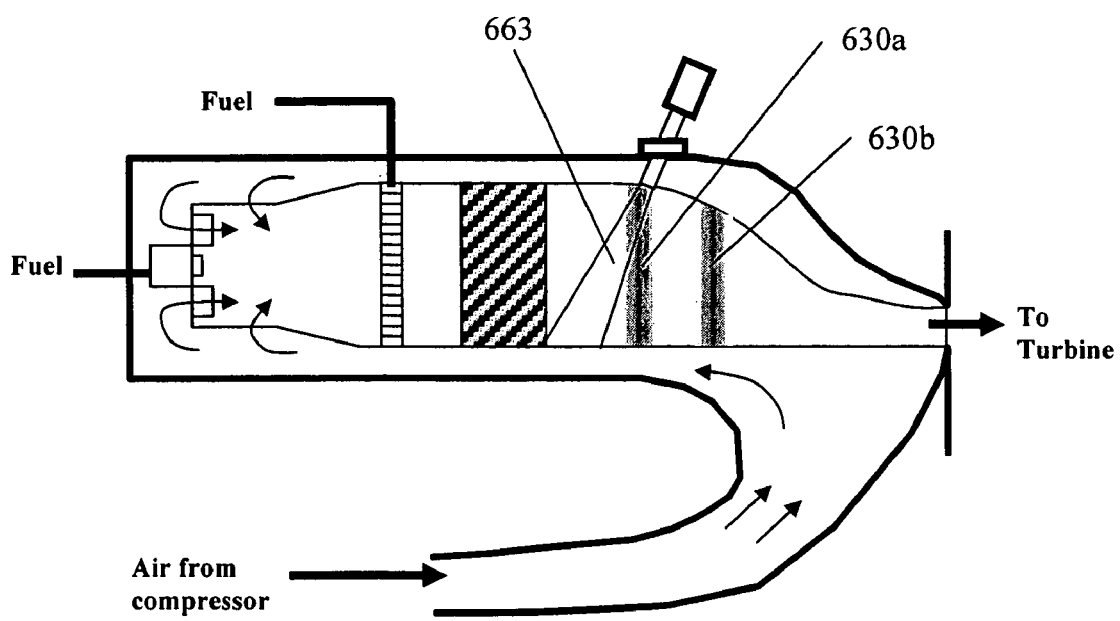
FIG. 6B is a figure similar to FIG. 6, but showing movement of a combustion process wave.

For example, referring to FIG. 5B, as the catalyst activity decreases (i.e.: as the catalyst degrades over time), the preferred catalyst operating window moves from 540a to 540b. To keep the homogeneous combustion wave located at a desired position, the preferred operating line must therefore be shifted from 543a: 542a: 544a to 543b: 542b: 544b. For example, referring to FIG. 6B, as the catalyst activity decreases, the combustion wave moves from 630a to 630b and the shift in the operating line moves (from 543b: 542b: 544b to 543a: 542a: 544a) the combustion wave back to 630a (i.e.: the desired location for the homogeneous combustion wave).

The operating diagrams shown in FIG. 5 and FIG. 5B show an exemplary relationship between catalyst inlet gas temperature and the fuel air ratio. The present invention is not limited to such operating diagrams. For example, another alternative is to define the operating diagram as a relationship of catalyst inlet gas temperature to a third variable such as engine load, exhaust gas temperature, combustor outlet temperature, turbine inlet temperature, compressor discharge temperature, compressor discharge pressure or some other system parameter or some combination of these parameters could be used to define the operating line. An operating diagram may thus be plotted wherein the fuel air ratio is then expressed in a preferred relationship to this same system parameter. Stated another way, the fuel air ratio may be plotted on the X-axis and the selected third variable (or combination of variables) may then be plotted on the Y-axis. Similar to the operating diagrams of FIGS. 5 and 5B, a set of preferred operating conditions (resulting in minimal emissions) may then be plotted as an operating line along an operating diagram.

In accordance with the present invention, a method of determining the position of the operating line would be as follows. One preferred control system would have an operating line in which the homogeneous combustion wave is in the view of the optical sensor and gives a sensor signal of approximately 50% of full scale. If the sensor signal is not zero or sufficiently low, for example below 50% of full scale, the catalyst inlet gas temperature can be reduced until the sensor signal is below 50% of full scale. The catalyst inlet gas temperature can be increased in small steps and the sensor signal monitored. This process can be increased until the sensor signal is at 50% of full scale and the corresponding catalyst inlet gas temperature noted. This measured catalyst inlet gas temperature can then be compared to that value specified for the current operative operating line and an operating line shift calculated. If the operating line shift is larger then a predetermined value, then the operating line can be modified or a new operating line selected to bring the homogeneous combustion wave closer to the desired location. Other procedures would be apparent to those skilled in the art. For example, the preferred operating line may place the homogeneous combustion wave far downstream of the sensor view area. A test control line can be defined that places the homogeneous combustion wave at a location that would produce a sensor signal at 50% of full scale. At a selected time, the process of increasing the catalyst inlet gas temperature can be executed as described above and the catalyst inlet gas temperature at a sensor signal at 50% of full scale noted. This value can be compared to the value specified in the test control line and the shift used to either modify the preferred operating line or select a new operating line.

In preferred aspects, the performance of the catalyst in operation is tested with the inlet temperature of the catalyst being slowly increased while the sensor signal is monitored. In one exemplary aspect, the point at which the sensor signal reaches 50% scale is recorded. If the sensor signal reaches 50% of full scale with a temperature increase equal to of 20° C. (following the above example), then the catalyst performance is as originally specified and no change is made in the operating line. If an increase of 30° C. is required to obtain a sensor signal of 50% full scale, then the operating window has shifted by 10° C. The operating line is then accordingly raised by 10° C.

As explained above, the catalyst inlet gas temperature can be raised and lowered by varying the fraction of fuel being fed to the flame combustor, (e.g.: the fuel input 624 to flame burner 620 in FIG. 6); and into the fuel air mixer, (e.g. the fuel input 625 to fuel air mixer 68 in FIG. 6).

In various aspects of the present invention, periodic evaluation of the position of the operating line (ie: determination of which operating line the system is operating at) can be done on an hourly, daily, weekly or monthly basis depending on the system design and the expected rate of change of the combustion system performance. Alternatively, the evaluation process can be done essentially continuously by a periodic variation of the catalyst inlet gas temperature. For example, the catalyst inlet gas temperature can be "dithered" wherein the catalyst inlet gas temperature is varied up and down in a cyclic manner so that the sensor signal is increased and decreased periodically. The sensor signal can then be monitored and any change in the periodic variation can be used to induce a shift in the operating line so that the variation in sensor signal is maintained essentially constant.

Another approach to such continuous adjustment is to have the homogeneous combustion wave 630 within view region 663 of the sensor so that the sensor signal is at a given level such as 50% output. The operating line can then be continuously updated to position the homogeneous combustion wave 630 at a preferred location such that the sensor signal is at the desired level.

One method of implementing a change in the operating line would be to take the measured shift in catalyst inlet gas temperature at 50% sensor signal as described above and add this shift to the operating line over the entire range of fuel air ratios. Alternatively, a functional relationship can be used to describe the operating line and the shift at any one point can be used to scale the function over its entire useful range. Another alternative is to develop a series of operating lines and from the measure catalyst inlet gas temperature at 50% sensor output, select a specific operating line from the series of operating lines. Alternative approaches are possible.

In accordance with a preferred optional embodiment of the present invention, the sensor can be configured as shown in FIG. 7 wherein ultraviolet radiation sensor 771, which generates a sensor signal received by a controller system 772, is located near the outlet of the post catalyst reaction zone and just before the fully combusted gas mixture enters the turbine. The system configuration shown in FIG. 7 operates similar to that of FIG. 6, with the sensor located farther from the catalyst. An advantage of the system configuration shown in FIG. 7 is that it can be used to determine when the combustion wave is near the outlet of the post catalyst reaction zone (i.e.: close to the turbine inlet). Again, the operating line can be adjusted or selected by controller system 772 as required to maintain the catalyst operation in its desired range.

In accordance with another preferred optional embodiment of the present invention, two sensors 881 and 882 can be installed as shown in FIG. 8. In this configuration, the position of the homogeneous combustion wave can be varied over a wide range, yet still maintained within the zone between sensors 881 and 882. An advantage of the system configuration shown in FIG. 8 is that such an approach could be used to assess the limits or size of the operating window. Another advantage of this embodiment is that the combustor control system may be able to control over a wide operating range and the corrections to the control strategy are only induced when the system is at the limits of operation, that is, the homogeneous combustion wave is either too near the catalyst or too near the turbine inlet.

The present invention comprises a strategy for determining the real time performance of a catalytic combustion system and for changing the operating line using an optical sensor that has a signal output. In preferred aspects, the desired operating line is a monotonic function of the intensity of a flame or radical combustion process.

It is to be understood that various types of sensors can be used to determine the location of the homogeneous combustion process wave. Such sensors may include an ultraviolet sensor in the post catalyst combustion zone such as a silicon carbide semiconductor ultraviolet radiation sensitive photodiode. Such preferred optical sensors may preferably be sensitive to radiation in the 100 to 1000 nanometer spectral wavelength, or more particularly be sensitive to radiation in the 200 to 400 nanometer spectral wavelength. However, other exemplary types of sensors can also be used including the following:

(1) Ion Sensor—An ion sensor that is sensitive to the ions, radicals or other charged species can be used. An advantage of an ion sensor is that the homogeneous combustion process is a radical reaction process that produces significant concentrations of charged ion species with the ion concentration being highest in the main part of the homogeneous reaction zone. Accordingly, an ion sensor could be located just downstream of the catalyst or it could be located anywhere within the post catalyst reaction zone. Typical ion sensors consist of two electrically separate electrodes in the form of leads, probes, plates, tubes or other shapes. Alternatively, the ion sensor may comprise a single electrically separate electrode and some part of the combustor hardware such as the liner at the catalyst outlet face 610 of FIG. 6 or liner wall 662 of FIG. 6. A voltage or electrical potential difference is generated between the electrodes and the current flow between the electrodes is a function of the charged ion concentration in the region of the electrodes. In optional preferred aspects, such a sensor could be located in the axial center of the post catalyst homogeneous combustion zone. For example, it could be attached to the catalyst outlet or it could be located at the chamber wall 227 in FIG. 2.

(2) Carbon Monoxide Sensor or Analyzer—The homogeneous combustion of hydrocarbon fuels generates substantial amounts of carbon monoxide which is then rapidly oxidized away in the high temperature gas mixture just downstream of the homogeneous combustion wave. If the homogenous combustion wave is too close to the drive turbine (e.g.: FIG. 4B), then the temperature drop that occurs in the first stage of the drive turbine will stop the reaction of carbon monoxide and some carbon monoxide will exit the gas turbine. A measurement of carbon monoxide at the outlet of the combustor or at the turbine exhaust location will thus show a very rapid increase in carbon monoxide as the homogeneous combustion wave is forced very close to the drive turbine entrance. In an optional aspect of the present invention, measurement of carbon monoxide at the turbine exhaust or at any location downstream of the homogenous combustion process wave can then be used to monitor the performance of the catalytic combustion system by comparison to the initial performance of the system.

(3) Temperature Measurement—Within the homogeneous combustion wave, the remaining fuel is combusted and the gas temperature rises significantly. Thus, temperature measurement can be used to assess the location of the homogeneous combustion wave. For instance, the gas temperature can be measured by a thermocouple inserted into the gas stream (e.g.: either near the chamber wall 227 of FIG. 2 or at the axial center possibly attached to the exit face of the catalyst or at any location downstream of the catalyst exit face). Alternatively, the temperature of the metal chamber wall (e.g.: 217 of FIG. 2) can be measured with the temperature of the gas stream inferred. Yet another approach to measure the temperature of the gas stream is to withdraw or extract a sample of the gas stream and pass it over a temperature measuring device such as thermocouple or other temperature measuring means that is external to the post catalyst homogeneous reaction zone. Alternatively, optical sensors are also available that can measure gas temperature.

Alternatively, the gas can be extracted from a region downstream of the catalyst with a sensor measuring the concentration of carbon monoxide or uncombusted fuel in the extracted gas.

Alternatively, the sensor may comprise a carbon monoxide or hydrocarbon sensor positioned at the exhaust of the combustion process and position of the homogeneous combustion process wave may be determined from the measured concentration of carbon monoxide or hydrocarbons.

The use of a sensor as described herein will measure the performance of the combustion system. If the combustion system performance is measured periodically and recorded over time then a curve of measured combustion system performance versus time will be obtained. This curve of measured combustion system performance with time can be compared with predicted or expected combustion system performance and a deviation of measured performance from expected performance calculated. The magnitude of this deviation can then be used to initiate actions or to inform the operator or users of impending problems. For example, a failure of some component such as the fuel injection system, the upstream flame combustor system or the catalyst can cause a sudden change in system performance. Algorithms within the control system can monitor the magnitude of this deviation in performance or the rate of change of this deviation in performance and can initiate a variety of actions, for example, the operator can be warned of an impending problem. Alternatively, a prediction of system performance with time can be made and the desired date of next service reported to the operator. In addition, the control system can take immediate action based on the comparison of measured performance and expected performance. For example, the combustion system can be shut down, the fuel can be switched to an alternate source or the control algorithms can be switched to a safe mode that will continue to operate the combustion process within safe parameters.

For example, the present invention further optionally comprises a method of modifying an operating line used to control a catalytic combustion system comprising a flame burner, a fuel injector positioned downstream of the flame burner and a catalyst positioned downstream of the fuel injector, wherein a portion of the fuel combusts within the catalyst and the remainder of the fuel combusts in the region downstream of the catalyst in a homogeneous combustion process wave, and a sensor located downstream of the catalyst, wherein the operating line has an expected sensor signal, by (i) stepwise changing the catalyst inlet gas temperature; (ii) monitoring the sensor signal; (iii) calculating a difference between the measured sensor signal and the expected sensor signal; and (iv) modifying the operating line based on the calculated difference between the measured sensor signal and the expected sensor signal.

In optional preferred aspects, the method further comprises informing an operator that the rate of change in movement of the operating line over time is above a predetermined limit by: (i) pre-determining an expected rate of change of the operating line over time, (ii) measuring the rate of change of the operating line over time; and (iii) informing an operator that the rate of change in movement of the operating line over time is above a predetermined limit when the measured rate of change of the operating line exceeds the expected rate of change of the operating line.

In optional preferred aspects, predetermining an expected rate of change of the operating line over time comprises determining an expected rate of change of the operating line from a model of the catalyst or combustor system. In this aspect, the model may use operating conditions of the gas turbine and combustor system to determine catalyst operating conditions to thereby determine an expected rate of change of the operating line. Additionally, the method may further comprise estimating the remaining time in which the combustion system will meet preferred emissions performance by comparing the measured rate of change of the operating line over time with the expected rate of change of the operating line over time.

The present invention can advantageously be applied to a combustion process in which there are two or more combustion chambers connected to a common air supply source and these combustion chambers supply hot gases to a common process. This can be the case in a gas turbine plant in which there is a single large compressor supplying compressed air to two or more combustion chambers with the hot gases from these combustion chambers flowing through a common drive turbine. Generally, there is a single fuel control valve that controls the fuel to these multiple combustion chambers. In the present invention, a sensor can be positioned to monitor the homogeneous reaction wave in either one chamber or in multiple chambers. If the chambers are well matched in performance, then a sensor in a single chamber will allow good control of the catalytic combustion process in all of the chambers and the control of the gas turbine plant. Alternatively, sensors can monitor the combustion process in several chambers and the signal from these sensors averaged or processed in some manner to provide optimal control of the process. However, if the combustion chambers are not well matched, then sensors could be located in all of the combustion chambers and the signals from all of the sensors used to control the overall process as well as adjust the operation of each separate combustion chamber to give similar performance. The operation of each combustion chamber could be accomplished by a trim valve that modifies the fuel flow to each combustion chamber without modifying the total fuel flow to the process. The trim valve for a given fuel flow stream in a given combustion chamber would be controlled by the sensor on that combustion chamber while the total process fuel flow would be controlled by one or more of the sensor signals averaged or processed in some manner.

Figure 9A:
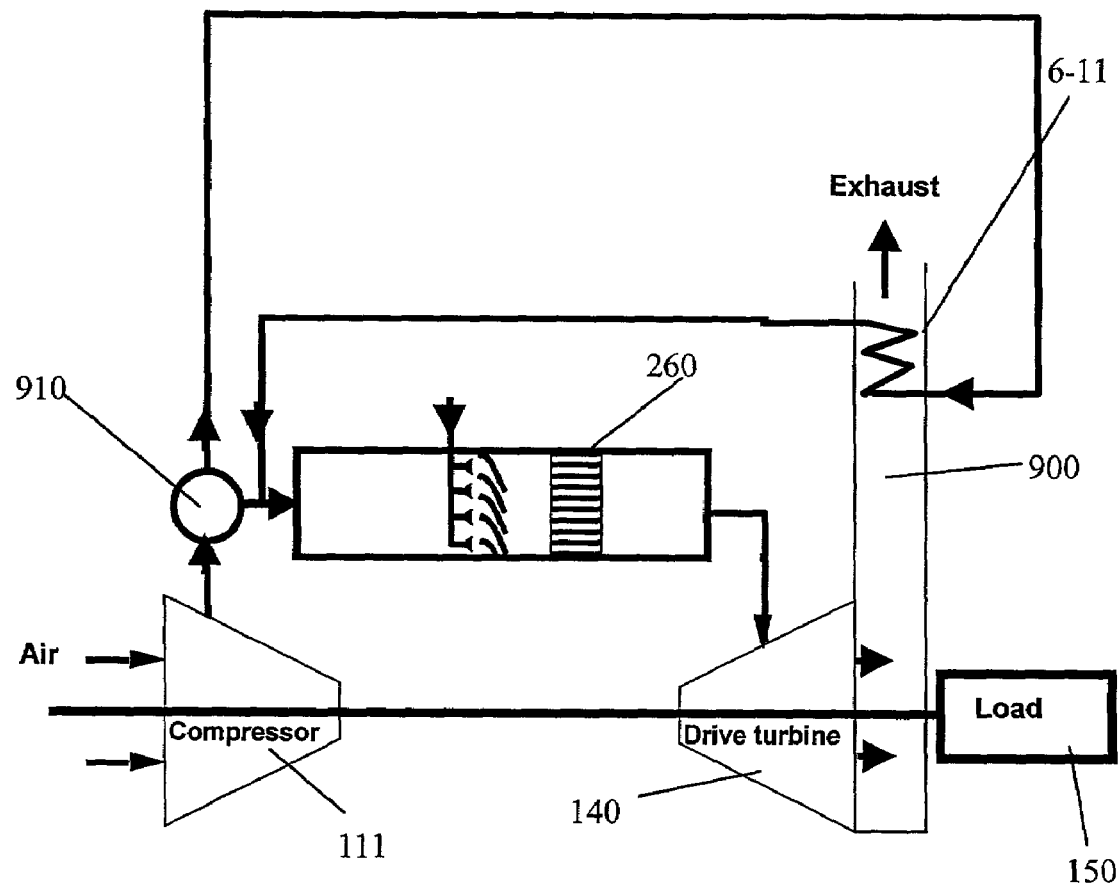
FIG. 9A is an embodiment of the first aspect of the invention, employing a heat exchanger using process exhaust heat to heat the air entering the compressor, wherein the percentage of combustion air flowing through the heat exchanger is adjustable.
Figure 9B:
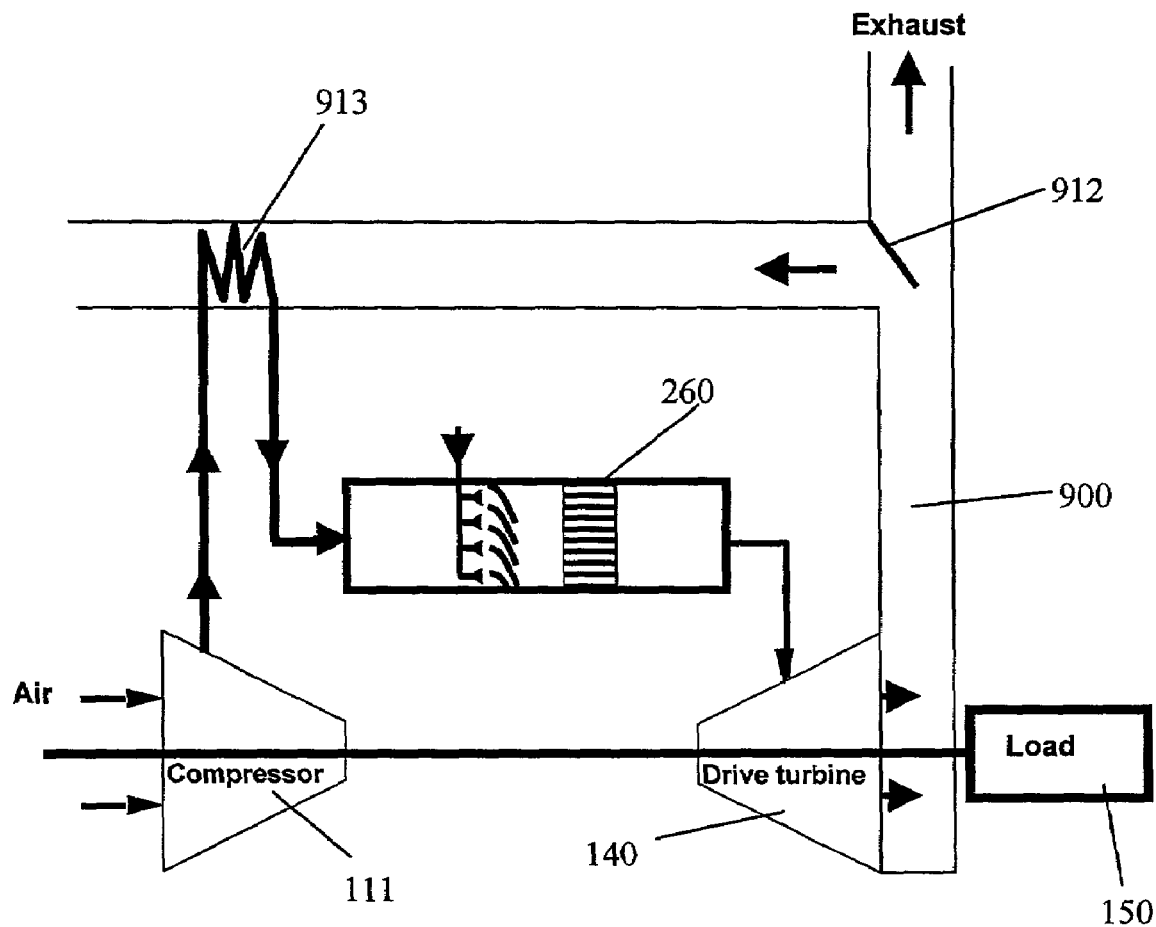
FIG. 9B is an alternate embodiment of the first aspect of the invention, employing a heat exchanger using process exhaust heat to heat the air entering the compressor, wherein the percentage of exhaust air flowing through the heat exchanger is adjustable.

Lastly, FIGS. 9A and 9B show respective embodiments of the invention, employing a heat exchanger using process exhaust air to heat the air entering the compressor. As shown in FIG. 9A, valve 910 can be used to adjust the percentage of combustion air flowing through heat exchanger 900. Similarly, as shown in FIG. 9B valve 912 can be used to adjust the percentage of exhaust air flowing through heat exchanger 913. In either case, varying the percentages of air flowing through heat exchanger 900 or 913 can be used to adjust the catalyst inlet gas temperature (for example, in accordance with a preferred operating line).

What is claimed is:

1. A method of controlling a catalytic combustion system comprising a flame burner, a fuel injector positioned downstream of the flame burner and a catalyst positioned downstream of the fuel injector, wherein a portion of the fuel combusts within the catalyst and the remainder of the fuel combusts in the region downstream of the catalyst in a homogeneous combustion process wave comprising: positioning a sensor to monitor the region downstream of the catalyst, the sensor having an output signal responsive to the location of the homogeneous combustion process wave; and using the sensor signal to adjust a catalyst inlet gas temperature to control the position of the homogeneous combustion process wave.

2. The method of claim 1, wherein using the sensor signal to adjust catalyst inlet gas temperature comprises: adjusting the catalyst inlet gas temperature based upon a predetermined schedule between the measured exhaust gas temperature and the calculated exhaust gas temperature at full load; and modifying the predetermined schedule based upon the sensor signal.

3. The method of claim 1, wherein using the sensor signal to adjust catalyst inlet gas temperature comprises: adjusting the catalyst inlet gas temperature based upon a predetermined schedule between the fuel air ratio and the catalyst inlet gas temperature; and modifying the predetermined schedule based upon the sensor signal.

4. The method of claim 1, wherein using the sensor signal to adjust catalyst inlet gas temperature comprises: adjusting the catalyst inlet gas temperature based upon a predetermined schedule between the adiabatic combustion temperature and the catalyst inlet gas temperature; and modifying the predetermined schedule based upon the sensor signal.

5. The method of claim 1, wherein using the sensor signal to adjust catalyst inlet gas temperature comprises: adjusting the catalyst inlet gas temperature based upon a predetermined series of schedules between the adiabatic combustion temperature and the catalyst inlet gas temperature; and selecting the predetermined schedule from among the series of schedules based upon the sensor signal.

6. The method of claim 1, wherein using the sensor signal to adjust catalyst inlet gas temperature comprises: adjusting the catalyst inlet gas temperature based upon a predetermined schedule between the fuel air ratio and the catalyst inlet gas temperature; and modifying the predetermined schedule based upon the sensor signal.

7. The method of claim 1, wherein using the sensor signal to adjust catalyst inlet gas temperature comprises: adjusting the catalyst inlet gas temperature based upon a predetermined series of schedules between the fuel air ratio and the catalyst inlet gas temperature; and selecting the predetermined schedule from among the series of schedules based upon the sensor signal.

8. The method of claim 1, wherein using the sensor signal to adjust catalyst inlet gas temperature comprises: adjusting the catalyst inlet gas temperature based upon a predetermined schedule that relates the difference between: (i) the measured exhaust gas temperature and the calculated exhaust gas temperature at full load, and (ii) the catalyst inlet gas temperature; and modifying the predetermined schedule based upon the sensor signal.

9. The method of claim 1, wherein using the sensor signal to adjust catalyst inlet gas temperature comprises: adjusting the catalyst inlet gas temperature based upon a predetermined series of schedules that relates: (i) the difference between the measured exhaust gas temperature and the calculated exhaust gas temperature at full load, and (ii) the catalyst inlet gas temperature; and selecting the predetermined schedule from among the series of schedules based upon the sensor signal.

10. The method of claim 1, in which the sensor is an optical sensor that is sensitive in the radiation spectral region of 100 to 1000 nanometers wavelength.

11. The method of claim 1, in which the sensor is an optical sensor that is sensitive in the radiation spectral region of 200 to 400 nanometers wavelength.

12. The method of claim 1, in which the sensor is a charged ion sensor.

13. The method of claim 1, in which the sensor is a temperature sensor in the gas downstream of the catalyst.

14. The method of claim 1, in which the sensor is located on the wall of the post catalyst reaction zone chamber.

15. The method of claim 1, wherein gas is extracted from the region downstream of the catalyst and the sensor measures the temperature of the extracted gas.

16. The method of claim 1, wherein gas is extracted from the region downstream of the catalyst and the sensor measures the concentration of carbon monoxide or uncombusted fuel in the extracted gas.

17. The method of claim 1, in which the sensor comprises a carbon monoxide or hydrocarbon sensor at the exhaust of the combustion process and position of the homogeneous combustion process wave is determined from the measured concentration of carbon monoxide or hydrocarbons.

18. The method of claim 1, wherein the gas temperature at the catalyst inlet is adjusted by changing the fuel flow to the flame burner.

19. The method of claim 1, wherein the gas temperature at the catalyst inlet is adjusted by changing the percentages of fuel split between the flame burner and the injector.

20. A system for controlling a catalytic combustion system, comprising: a flame burner; a fuel injector positioned downstream of the flame burner; a catalyst positioned downstream of the fuel injector, wherein a portion of the fuel combusts within the catalyst and the remainder of the fuel combusts in the region downstream of the catalyst in a homogeneous combustion process wave; a sensor positioned to monitor the region downstream of the catalyst, the sensor having an output signal responsive to the location of the homogeneous combustion process wave; and a system for using the sensor signal to adjust a catalyst inlet gas temperature to control the position of the homogeneous combustion process wave.

21. The system of claim 20, wherein the system for using the sensor signal to adjust the catalyst inlet gas temperature comprises: a system for adjusting the catalyst inlet gas temperature based upon a predetermined schedule between the measured exhaust gas temperature and the calculated exhaust gas temperature at full load; and a system for modifying the predetermined schedule based upon the sensor signal.

22. The system of claim 21, wherein the system for using the sensor signal to adjust the catalyst inlet gas temperature comprises: a system for adjusting the catalyst inlet gas temperature based upon a predetermined schedule between the fuel air ratio and the catalyst inlet gas temperature; and a system for modifying the predetermined schedule based upon the sensor signal.

23. The system of claim 21, wherein the system for using the sensor signal to adjust the catalyst inlet gas temperature comprises: a system for adjusting the catalyst inlet gas temperature based upon a predetermined schedule between the adiabatic combustion temperature and the catalyst inlet gas temperature; and a system for modifying the predetermined schedule based upon the sensor signal.

24. The system of claim 21, wherein the system for using the sensor signal to adjust the catalyst inlet gas temperature comprises: a system for adjusting the catalyst inlet gas temperature based upon a predetermined schedule between the fuel air ratio and the catalyst inlet gas temperature; and a system for modifying the predetermined schedule based upon the sensor signal.

25. The system of claim 21, wherein the system for using the sensor signal to adjust the catalyst inlet gas temperature comprises: a system for adjusting the catalyst inlet gas temperature based upon a predetermined schedule that relates the difference between: (i) the measured exhaust gas temperature and the calculated exhaust gas temperature at full load, and (ii) the catalyst inlet gas temperature; and a system for modifying the predetermined schedule based upon the sensor signal.

26. The system of claim 21, wherein the sensor is an optical sensor that is sensitive in the radiation spectral region of 100 to 1000 nanometers wavelength.

27. The system of claim 21, wherein the sensor is an optical sensor that is sensitive in the radiation spectral region of 200 to 400 nanometers wavelength.

28. The system of claim 21, wherein the sensor is a charged ion sensor.

29. The system of claim 21, wherein the sensor is a temperature sensor in the gas downstream of the catalyst.

30. The system of claim 21, wherein the sensor is located on the wall of the post catalyst reaction zone chamber.

31. The system of claim 21, further comprising: a system for extracting gas from a region downstream of the catalyst, wherein the sensor measures the temperature of the extracted gas.

32. The system of claim 21, further comprising: a system for extracting gas from a region downstream of the catalyst, wherein the sensor measures the concentration of carbon monoxide or uncombusted fuel in the extracted gas.

33. The system of claim 21, wherein the sensor comprises a carbon monoxide or hydrocarbon sensor at the exhaust of the combustion process and position of the homogeneous combustion process wave is determined from the measured concentration of carbon monoxide or hydrocarbons.

* * * * *